US012101589B2

(12) United States Patent
Wang et al.

(10) Patent No.: US 12,101,589 B2
(45) Date of Patent: Sep. 24, 2024

(54) ACOUSTIC OUTPUT APPARATUSES

(71) Applicant: SHENZHEN SHOKZ CO., LTD., Guangdong (CN)

(72) Inventors: Yueqiang Wang, Shenzhen (CN); Zhongqi Wu, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 163 days.

(21) Appl. No.: 17/816,404

(22) Filed: Jul. 30, 2022

(65) Prior Publication Data

US 2022/0369021 A1 Nov. 17, 2022

Related U.S. Application Data

(63) Continuation of application No. PCT/CN2021/087897, filed on Apr. 16, 2021.

(30) Foreign Application Priority Data

Apr. 30, 2020 (CN) ......................... 202020720220.2
Apr. 30, 2020 (CN) ......................... 202020720248.6

(51) Int. Cl.
*H04R 1/10* (2006.01)

(52) U.S. Cl.
CPC ........... *H04R 1/1041* (2013.01); *H04R 1/105* (2013.01)

(58) Field of Classification Search
CPC .... H04R 1/105; H04R 1/1041; H04R 25/607; H05R 2225/0213

(Continued)

(56) References Cited

U.S. PATENT DOCUMENTS 6,078,825 A * 6/2000 Hahn .................. H04M 1/6066 379/430
6,252,970 B1 * 6/2001 Poon ...................... H04R 1/105 181/129

(Continued)

FOREIGN PATENT DOCUMENTS

CN 107493532 * 12/2017
CN 107493532 A 12/2017

(Continued)

OTHER PUBLICATIONS

International Search Report in PCT/CN2021/087897 mailed on Jul. 21, 2021, 6 pages.

(Continued)

*Primary Examiner* — William A Jerez Lora
(74) *Attorney, Agent, or Firm* — METIS IP LLC

(57) ABSTRACT

The present disclosure provides an acoustic output apparatus. The acoustic output apparatus includes a speaker assembly, configured to convert an audio signal into a sound signal; an ear hook assembly, including an ear hook housing and a connecting part, the ear hook housing having an accommodating space to accommodate a battery assembly and/or a control circuit assembly, one end of the connecting part connecting to the speaker assembly, and the other end of the connecting part connecting to the ear hook housing, wherein the connecting part includes at least one first wire clamping part used to restrict a set of lead wires drawn out from the speaker assembly and extending into the accommodating space, the set of lead wires electrically connect the speaker assembly to the battery assembly and/or the control circuit.

19 Claims, 18 Drawing Sheets

(58) Field of Classification Search
USPC ........................... 381/91, 122, 301, 330, 381
See application file for complete search history.

(56) References Cited

U.S. PATENT DOCUMENTS

| | | | | |
|---|---|---|---|---|
| 2014/0334658 | A1* | 11/2014 | Wang | B29C 45/14549 381/381 |
| 2015/0189419 | A1* | 7/2015 | Davie | H04R 1/1041 381/381 |
| 2016/0353192 | A1 | 12/2016 | Huang | |

FOREIGN PATENT DOCUMENTS

| | | | |
|---|---|---|---|
| CN | 209767789 | U | 12/2019 |
| CN | 210042147 | * | 2/2020 |
| CN | 210042147 | U | 2/2020 |
| CN | 211702352 | U | 10/2020 |
| CN | 211880591 | U | 11/2020 |

OTHER PUBLICATIONS

Written Opinion in PCT/CN2021/087897 mailed on Jul. 21, 2021, 6 pages.

* cited by examiner

A-A

ACOUSTIC OUTPUT APPARATUSES

CROSS-REFERENCE TO RELATED APPLICATION

This application is a Continuation of International Patent Application No. PCT/CN2021/087897, filed on Apr. 16, 2021, which claims priority to Chinese Patent Application No. 202020720248.6, filed on Apr. 30, 2020, and Chinese Patent Application No. 202020720220.2, filed on Apr. 30, 2020, the contents of each of which are entirely incorporated herein by reference.

TECHNICAL FIELD

The present disclosure relates to the technical field of acoustic output, and more particularly to an acoustic output apparatus.

BACKGROUND

With the development of acoustic output technology, acoustic output apparatus has been widely used. An acoustic output apparatus (e.g., an open-back headphone, an in-ear headphone, etc.) is a portable audio output apparatus that realizes sound conduction within a specific range. In practice, connections between components of the acoustic output apparatus (e.g., the connection between a speaker and an ear hook of the acoustic output apparatus) needs to have relatively good structural stability to ensure that the acoustic output apparatus has relatively good quality.

Therefore, it is desirable to provide an acoustic output apparatus with relatively good structural stability.

SUMMARY

Some embodiments of the present disclosure provide an acoustic output apparatus, including a speaker assembly, configured to convert an audio signal into a sound signal; an ear hook assembly, including an ear hook housing and a connecting part, the ear hook housing having an accommodating space to accommodate a battery assembly and/or a control circuit assembly, one end of the connecting part connecting to the speaker assembly, and the other end of the connecting part connecting to the ear hook housing, wherein the connecting part includes a first wire clamping part used to restrict a set of lead wires drawn out from the speaker assembly and extending into the accommodating space, the set of lead wires electrically connect the speaker assembly to the battery assembly and/or the control circuit, the first wire clamping part fixes the set of lead wires in a radial direction of the set of lead wires, the first wire clamping part has a first lead wire channel, and the set of lead wires drawn out from the speaker assembly enters the accommodating space through the first lead wire channel.

In some embodiments, the connecting part may include an ear hook elastic wire and a joint part connected to one end of the ear hook elastic wire, wherein the joint part may be plug-fitted with the speaker assembly, and the other end of the ear hook elastic wire may be connected to the ear hook housing.

In some embodiments, the ear hook housing may include a second wire clamping part used to fix the set of lead wires in the radial direction of the set of lead wires, the second wire clamping part may have a second lead wire channel, and the set of lead wires drawn out from the speaker assembly may enter the accommodating space through the first lead wire channel and the second lead wire channel in sequence.

In some embodiments, the first wire clamping part may include at least two first sub-wire clamping parts arranged at intervals, and the at least two first sub-wire clamping parts may form the first lead wire channel in a longitudinal direction of the set of lead wires.

In some embodiments, extension lengths of the two first sub-wire clamping parts in the longitudinal direction of the set of lead wires may be different.

In some embodiments, the second sub-clamping part may include two second sub-wire clamping parts arranged at intervals, and the two second sub-wire clamping parts may be opposite to each other and form the second lead wire channel.

In some embodiments, the connecting part may include an ear hook elastic coating, and the ear hook elastic coating may wrap a periphery of the ear hook elastic wire, a portion of the joint part, and a portion of the ear hook housing.

In some embodiments, the joint part may include at least two sub-ends, and the at least two sub-ends may be located at one end of the joint part that is inserted with the speaker assembly, wherein the at least two sub-ends may be spaced apart along a circumferential direction of the end that is inserted with the speaker assembly.

In some embodiments, peripheries of the at least two sub-ends may be provided with protrusions, when the joint part is inserted into the speaker assembly, the protrusions may be locked and limited by the speaker assembly, so as to restrict the joint part from moving in a direction away from the speaker assembly.

In some embodiments, the speaker assembly may include a first speaker housing, a second speaker housing, a speaker, and a rotating member, the first speaker housing and the second speaker housing may be connected to form a containment space for accommodating the speaker, the first speaker housing may be provided with a first through hole, the first through hole may be communicate with the containment space, and the rotating member may be rotatably inserted into the first through hole.

In some embodiments, the first speaker housing maybe provided with a second through hole, the second through hole may be spaced apart from the first through hole, the joint part may be inserted into the second through hole, protrusions of the joint part may be located in the containment space, and the protrusions may be clamped on an edge of a connection between the second through hole and the containment space.

In some embodiments, the first speaker housing may include a bottom wall and a side wall connected to each other, the side wall surrounds the bottom wall, the second speaker housing covers on a side of the side wall may away from the bottom wall to form the containment space, the first through hole may be formed on the bottom wall, and the second through hole may be formed on the side wall.

In some embodiments, the bottom wall may include a first convex part departing from the containment space, and the first through hole may be formed in the first convex part; the side wall may include a second convex part departing from the containment space, and the second through hole may be formed in the second convex part; wherein, a protruding direction of the first convex part and a protruding direction of the second convex part may be perpendicular to each other, and the first convex part and the second convex part may be connected in an arc shape.

In some embodiments, the apparatus further may include a microphone tube assembly connected to the rotating member, the microphone tube assembly may be rotated relative to the first speaker housing by the rotating member, a set of lead wires of the microphone tube assembly may pass through the first through hole, and enter into the second through hole through the containment space.

In some embodiments, the rotating member may include a lead part and a rotating part may be connected to each other, the lead part may be formed with a first hole segment, the rotating part may be formed with a second hole segment along an axial direction of the rotating part, and the first hole segment may be communicated with the second hole segment; the speaker assembly may include a fixing member, the fixing member may include a fixing body and a plug pin may be arranged at one end of the fixing body, the fixing body may be inserted into the second hole segment, and the plug pin may be inserted into a fixing hole to limit a movement of the microphone tube assembly.

In some embodiments, the rotating member may include a rotating body, a first clamping part, and a second clamping part, the first clamping part and the second clamping part may be protruded on both ends of the rotating body along a radial direction of the rotating member, the rotating body may be embedded in the first through hole, and the first clamping part and the second clamping part may be respectively abutted on both sides of the first speaker housing to limit a movement of the rotating part in the axial direction of the rotating part.

In some embodiments, a damping groove may be formed between the first clamping part and the second clamping part along a circumferential direction of the rotating body; the speaker assembly may include a damping member, the damping member may be arranged in the damping groove and may be in contact with a peripheral wall of the first through hole, so as to provide a rotation damping for the rotating member through a contact friction.

In some embodiments, a limit groove spaced apart from the damping groove may be formed between the first clamping part and the second clamping part along the circumferential direction of the rotating body, the limit groove may be arranged in an open ring shape, the peripheral wall of the first through hole may be protruded with a convex block embedded in the limit groove, and when the rotating part rotates relative to the first speaker housing, the convex block may abut on both ends of the limit groove to limit a rotating range of the rotating part.

In some embodiments, the speaker assembly may include a pressing member, configured to press the set of lead wires of the microphone tube assembly that passes through the first through hole to the second through hole, and the pressing member may be disposed in the containment space and cover the first through hole.

In some embodiments, the pressing member may include a hard cover plate and an elastic body arranged in layers, and the hard cover plate may be farther from the first through hole than the elastic body, wherein the elastic body may contact the set of lead wires.

In some embodiments, the microphone tube assembly may include an elastic connecting rod and a sound pickup assembly, and one end of the elastic connecting rod may be inserted into the first through hole, the other end of the elastic connecting rod may be plug-fitted with the sound pickup assembly, and the elastic connecting rod may make an average amplitude attenuation rate not smaller than 35% when a vibration of a voice frequency band generated by the speaker assembly is transmitted from one end of the elastic connecting rod to the other end of the elastic connecting rod.

In some embodiments, the apparatus may include an optical sensor, and the acoustic output apparatus may be used to detect whether the acoustic output apparatus is worn through the optical sensor; the ear hook housing may form a window for transmitting an optical signal of the optical sensor, the window may be disposed adjacent to the connecting part so that the window may be positioned adjacent to a base of a wearer's ear when the acoustic output apparatus is worn.

In some embodiments, the window may be arranged in a racetrack shape, and an extension line of a central axis of the connecting part may intersect with a long axis of the window.

DETAILED DESCRIPTION

Figure 1:
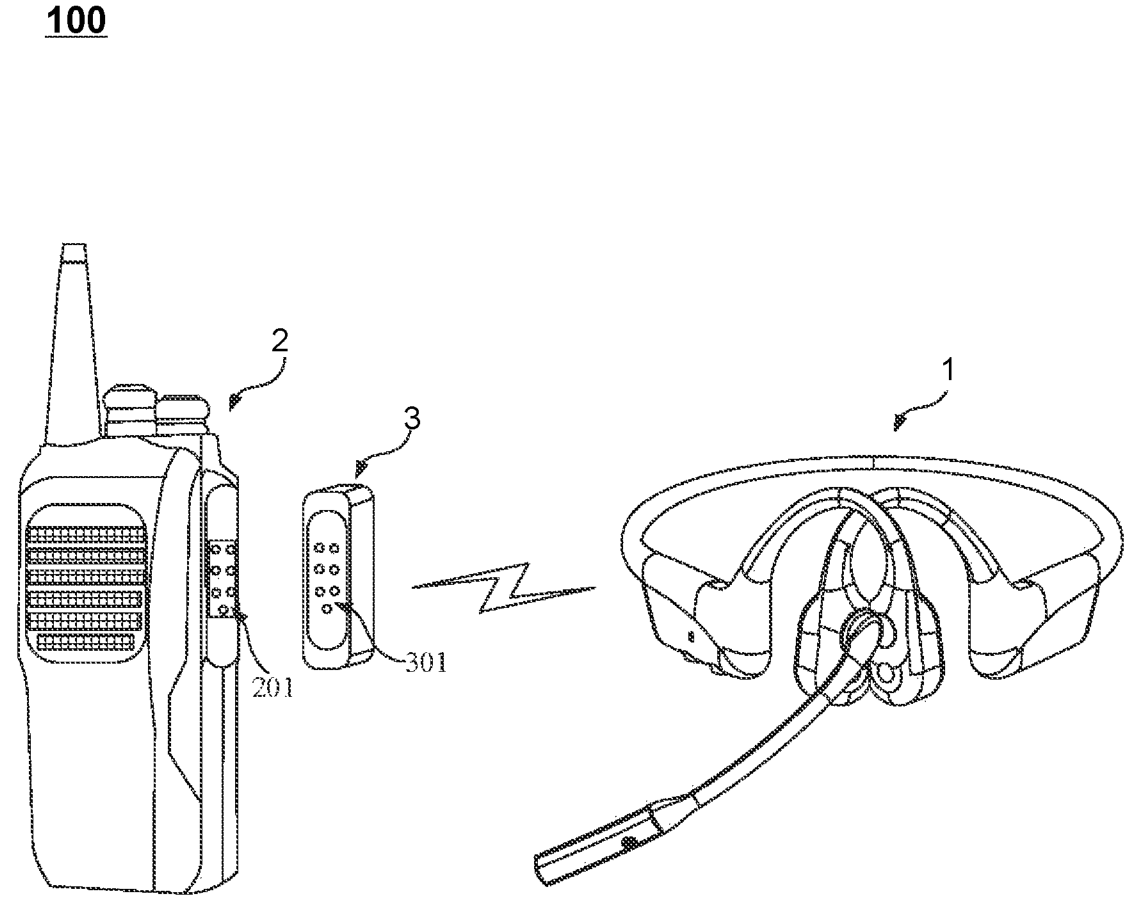
FIG. 1 illustrates a schematic structural diagram of a communication system according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly dictates otherwise, the terms "a", "an", and/or "the" do not only specifically refer to the singular, but also include the plural. In general, the terms "including" and "comprise" merely prompt to include steps and elements that have been clearly identified, and these steps and elements do not constitute an exclusive listing. The methods or devices may also include other steps or elements.

Some embodiments of the present disclosure describe an acoustic output apparatus, the acoustic output apparatus may include a speaker assembly and an ear hook assembly. The speaker assembly may be configured to convert an audio signal into a sound signal. The ear hook assembly may include an ear hook housing and a connecting part, the ear hook housing may have an accommodating space to accommodate a battery assembly and/or a control circuit assembly, one end of the connecting part may connect to the speaker assembly, and the other end of the connecting part may connect to the ear hook housing. The connecting part may include a first wire clamping part, the first wire clamping part may have a first lead wire channel, and the first lead wire channel of the first wire clamping part is used to restrict a set of lead wires drawn out from the speaker assembly and extending into the accommodating space, and the set of lead wires electrically connect the speaker assembly to the battery assembly and/or the control circuit. In some embodiments, the set of lead wires drawn out from the speaker assembly enters the accommodating space through the first lead wire channel, and the first lead wire channel may be used to clamp the set of lead wires in a radial direction of the set of lead wires to prevent the movement of the set of lead wires in its radial direction. Thereby, the shaking of the set of lead wires during the manufacturing process or actual use of the acoustic output apparatus may be reduced, the set of lead wires may be more stable, and the yield of the product and the service life of the acoustic output apparatus may be improved.

In some embodiments, the connecting part may include a joint part, and the joint part is plug-fitted with the speaker assembly. In order to improve the connection stability and structural reliability of the ear hook assembly and the speaker assembly in the acoustic output apparatus, an end of the joint part used for plug-fitted with the speaker assembly may include a plurality of sub-ends. The plurality of sub-ends may improve the elasticity of the end of the joint part, so that the plurality of sub-ends may be brought closer to each other under the pressing action of the external force and may be elastically restored after the external force is removed. When the joint part is inserted into the speaker assembly, the plurality of sub-ends may be squeezed to be close to each other, so that the end of the joint part becomes smaller to facilitate the smooth insertion of the joint part. In some embodiments, peripheries of the plurality of sub-ends are provided with protrusions. When the joint part is inserted into the speaker assembly, the protrusions may be locked and limited by the speaker assembly, so as to limit the movement of the joint part away from the speaker assembly. Thereby, the connection stability and structural reliability of the ear hook assembly and the speaker assembly may be improved, and the structure of the acoustic output apparatus is simple.

In some embodiments, the acoustic output apparatus may be combined with a terminal device to form a communication system to realize the communication function. In some embodiments, the terminal device may include, but is not limited to, at least one of an intercom device, a mobile device, a tablet computer, and a notebook computer, or the like. In some embodiments, the intercom device may be a civil intercom, a commercial intercom, a police intercom, and a railway intercom, etc. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

In order to facilitate the description of the communication system, the following describes an intercom device as an exemplary terminal device. Intercom device plays a very important role in cluster communication. It is used for contact among group members and is widely used in civil, industrial, police and other fields. However, the confidentiality of the voice communication of the intercom device is not strong, and the noise of the external environment is likely to cause great interference to the voice communication of the intercom device, making it difficult for the user to hear the content of the call. It makes the communication quality of the intercom device poor and the usage scenarios are limited. In addition, in some cases, the use environment of the intercom device is complex, and the user expects to maintain a relatively good perception of the external environment while performing intercom communication. In practical applications, in order to enhance the confidentiality of the voice communication of the intercom device and reduce the interference of the noisy external environment, users may listen to the sound played by the intercom device through an acoustic output equipment (e.g., a bone conduction headphone or an air conduction headphone). For example, when the acoustic output equipment is a bone conduction headphone, the acoustic output equipment is close to but does not block the user's ear, so that the user can hear the content of the call clearly while maintaining a relatively good perception of the external sound information. For the purpose of illustration, the embodiment of the present disclosure provides a communication system, which may be applied to intercom communication. The communication system will be described in detail below.

FIG. 1 illustrates a schematic structural diagram of a communication system 100 according to some embodiments of the present disclosure. As shown in FIG. 1, the communication system 100 may include an acoustic output apparatus 1, an intercom device 2, and a communication module 3.

The acoustic output apparatus 1 may be a portable audio apparatus that realizes sound conduction within a certain range. In some embodiments, the acoustic output apparatus 1 may include a bone conduction headphone and/or an air conduction headphone. In some embodiments, the acoustic output apparatus 1 may include an in-ear headphone, a headphone, an open-back headphone, etc. In some embodiments, the acoustic output apparatus 1 may be worn on a user's head or other parts (e.g., a neck, a shoulder, etc.) through a fixing structure (e.g., an ear hook). In some embodiments, the acoustic output apparatus 1 may also be combined with other wearable devices (e.g., a smart helmet, glasses, etc.) to be worn on the user's head or other parts. In some embodiments, when the acoustic output apparatus 1 is a bone conduction headphone, the acoustic output apparatus 1 may be close to but not block the user's ear, so that the user may hear the sound played by the acoustic output apparatus 1 clearly, and at the same time, have a relatively good perception of the sound information of the outside world. The bone conduction headphone may convert audio into mechanical vibrations of different frequencies, use human bones as a medium to transmit mechanical vibrations, and then transmit sound waves to the auditory nerve, so that users may receive sound without passing through an external auditory canal and tympanic membrane of the ear. In some embodiments, when the acoustic output apparatus 1 is an open air conduction headphone, the acoustic output apparatus 1 may also be close to but not block the user's ear. The open air conduction headphone may create a directional sound field in space through special design (e.g., forming a pair of equal and opposite dipoles).

The intercom device 2 (also referred to as an intercom) may be used as a wireless communication device in mobile communication, for example, for cluster communication. In some embodiments, the intercom may convert an audio electrical signal into a radio frequency carrier signal through its transmitting component, and then transmit it via an antenna through an amplification, a filtering, etc. The antenna of the intercom device 2 may also receive input signals sent by other intercom devices, and undergo the conversion, the filtering, the amplification, and the frequency mixing to form audio signals, which is played through speakers. In some embodiments, the intercom device 2 may be a civil intercom, a commercial intercom, a police intercom, and a railway intercom, etc.

In some embodiments, the acoustic output apparatus 1 and the intercom device 2 may perform a communication connection through the communication module 3. The communication connection may be a wireless connection, e.g., a Bluetooth connection, a Wi-Fi™ connection, a WiMax™ connection, a WLAN connection, a ZigBee connection, a mobile network connection (e.g., 3G, 4G, 5G, etc.), or the like, or a combination thereof. The communication connection may also be a wired connection, including an electrical cable, an optical cable, a telephone line, or the like, or any combination thereof.

In some embodiments, the acoustic output apparatus 1 includes a built-in communication module (e.g., a Bluetooth module), and the communication module 3 may be a built-in communication module of the intercom device 2. Or the communication module 3 may be an external communication module of the intercom device 2, which may be used as a medium for communication between the acoustic output apparatus 1 and the intercom device 2. Merely by way of example, as shown in FIG. 1, the intercom device 2 may include a first external interface 201, which may include a plurality of contacts arranged at intervals, for example, 7 contacts. The communication module 3 may include a second external interface 301, which may include as many contacts as the first external interface 201. The communication module 3 may be detachably installed on the intercom device 2 through the first external interface 201 and the second external interface. When the communication module 3 is installed on the intercom device 2, the first external interface 201 and the second external interface 301 are connected, so that the intercom device 2 may realize the external communication function through the communication module 3. In some embodiments, the intercom device 2 and the communication module 3 may be connected by other means, such as snap connection. In some embodiments, the first external interface 201 may implement different functions by connecting different external modules. For example, the first external interface 201 may be used to connect an external terminal for programming the intercom device 2, etc.

Figure 2:
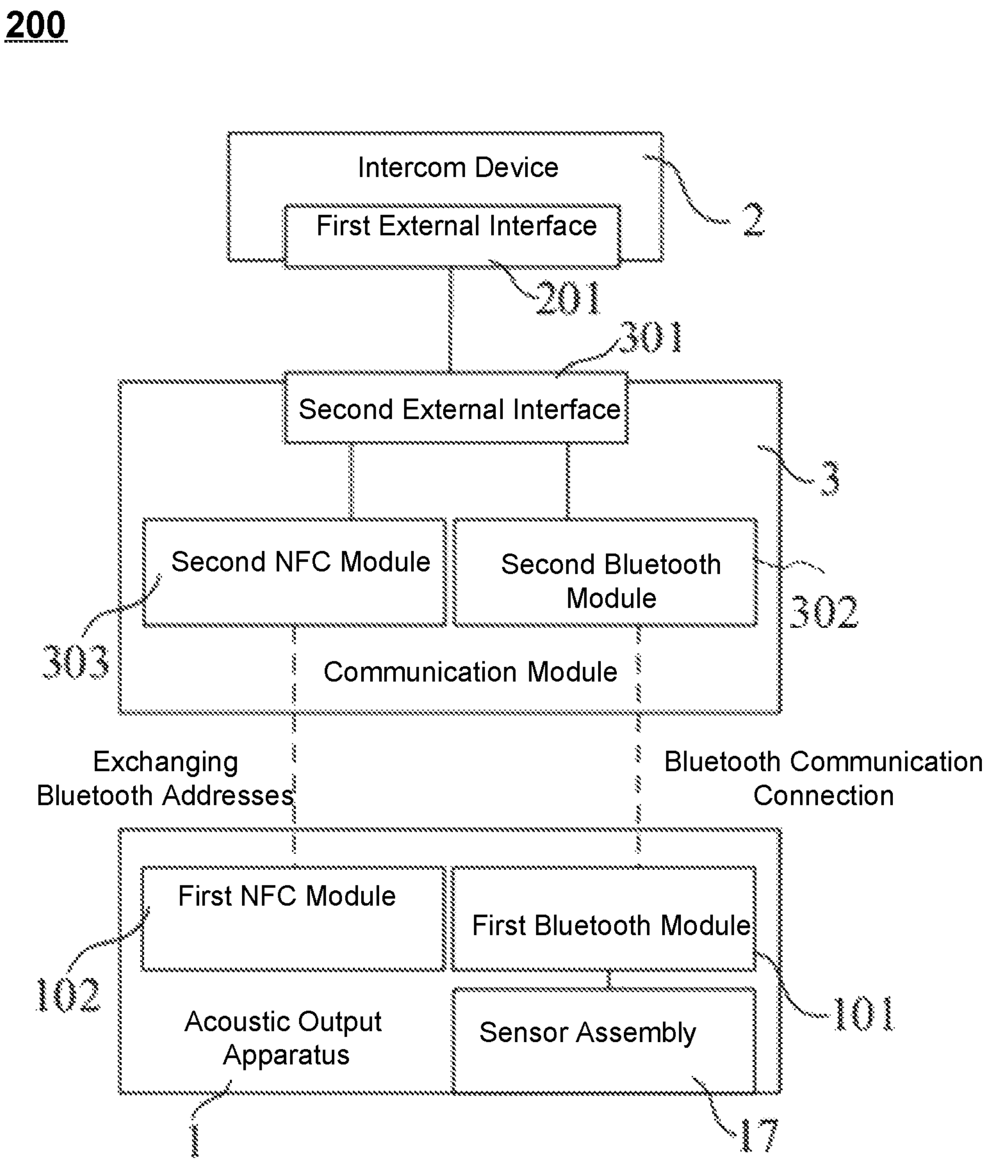
FIG. 2 illustrates a block diagram of a communication system according to some embodiments of the present disclosure.

FIG. 2 illustrates a block diagram of a communication system 200 according to some embodiments of the present disclosure. The communication system 200 may be an exemplary embodiment of the communication system 100 described in FIG. 1. As shown in FIG. 2, the communication system 200 includes an acoustic output apparatus 1, an intercom device 2, and a communication module 3. The communication module 3 may be an external communication module of the intercom device. The acoustic output apparatus 1 may include a first Bluetooth module 101, and the communication module 3 may include a second Bluetooth module 302. The intercom device 2 may establish a Bluetooth connection through the second Bluetooth module 302 of the communication module 3 and the first Bluetooth module 101 of the acoustic output apparatus 1. In some embodiments, the audio received by the intercom device 2 may be listened to through the acoustic output apparatus 1. In some embodiments, after the Bluetooth connection is established between the intercom device 2 and the acoustic output apparatus 1 through the communication module 3, the intercom device 2 may be controlled by using the acoustic output apparatus 1. For example, the corresponding voice is sent through the acoustic output apparatus 1 to control the intercom device 2. In some embodiments, the acoustic output apparatus 1 may also be controlled through the intercom device 2.

In some embodiments, in order to facilitate the rapid Bluetooth connection between the acoustic output apparatus 1 and the intercom device 2, fast pairing may be implemented between the acoustic output apparatus 1 and the intercom device 2 by rapidly exchanging Bluetooth addresses. As shown in FIG. 2, the acoustic output apparatus 1 may also have an NFC near field communication function. In some embodiments, the acoustic output apparatus 1 may include a first NFC module 102, and the first NFC module 102 may be used to implement a near field communication function. In some embodiments, the communication module 3 may include a second NFC module 303 that may be used for near field communication with the first NFC module 102. The acoustic output apparatus 1 and the intercom device 2 may exchange Bluetooth addresses through the near field communication of the first NFC module 102 and the second NFC module 303, so that the first Bluetooth module 101 and the second Bluetooth module 302 perform Bluetooth pairing to establish a Bluetooth connection.

In some embodiments, the acoustic output apparatus 1 may send its Bluetooth address to the intercom device 2 through the first NFC module 102 and the second NFC module 303, which may save the time of searching and selecting the acoustic output apparatus 1 of the intercom device 2. For example, the first NFC module 102 may store or obtain the Bluetooth address of the first Bluetooth module 101. When the first NFC module 102 and the second NFC module 303 perform near field communication, the first NFC module 102 may send the Bluetooth address to the second NFC module 303, so that the communication module 3 may obtain the Bluetooth address of the first Bluetooth module 101, to realize Bluetooth address exchange, and then to realize fast pairing and connection between the acoustic output apparatus 1 and the intercom device 2.

In some embodiments, the intercom device 2 may send its Bluetooth address to the acoustic output apparatus 1 through the first NFC module 102 and the second NFC module 303, so that may save the time of searching and selecting the intercom device 2 of the acoustic output apparatus 1. For example, the second NFC module 303 may store or obtain the Bluetooth address of the second Bluetooth module 302. When the first NFC module 102 and the second NFC module 303 perform near field communication, the second NFC module 303 may send the Bluetooth address of the second Bluetooth module 302 to the first NFC module 102, so that the acoustic output apparatus 1 may obtain the Bluetooth address of the second Bluetooth module 302, to realize Bluetooth address exchange, and then to realize fast pairing and connection between the acoustic output apparatus 1 and the intercom device 2.

In some embodiments, the acoustic output apparatus 1 and the intercom device 2 may exchange Bluetooth addresses with each other through the near field communication of the first NFC module 102 and the second NFC module 303, so as to save the time of searching and selecting between the two, and then to realize fast pairing and connection. For example, the first NFC module 102 may store or obtain the Bluetooth address of the first Bluetooth module 101, and the second NFC module 303 may store or obtain the Bluetooth address of the second Bluetooth module 302. When the first NFC module 102 and the second NFC module 303 perform near field communication, the first NFC module 102 and the second NFC module 303 may exchange each other's Bluetooth addresses to realize the exchange of Bluetooth addresses.

In some embodiments, the intercom device 2 may realize fast Bluetooth connection through the second NFC module 303 of the communication module 3 and the first NFC module 102 of the acoustic output apparatus 1, so that the intercom device 2 may be quickly matched different acoustic output apparatus 1. Taking industrial field operations as an example, different workers are equipped with different acoustic output apparatus 1. For example, two workers may share an intercom device 2, the two workers may alternately use the shared intercom device 2 during shifts, and may quickly connect to the intercom device 2 through the acoustic output apparatus 1 When a worker is on duty, the acoustic output apparatus 1 and the intercom device 2 used by the worker may be "connected by one touch", and then the communication system composed of the intercom device 2 and the acoustic output apparatus 1 may be used. When the worker gets off work and another worker starts to work on duty, the other worker may also make his acoustic output apparatus 1 and the intercom device 2 to perform "connected by one touch". And then the communication system composed of the intercom device 2 and the acoustic output apparatus 1 may form an operation logic of "independent" and "shared" coexistence. The "Independent" means that each person may use his own acoustic output apparatus 1 to communicate with the intercom device 2, and "shared" means that two workers may use the intercom device 2 together. In some embodiments, identities of users of each acoustic output apparatus 1 may be marked, so that multiple people may use the same intercom device 2, which may realize fast switching, and may also realize attendance punching, personal identity recognition, etc.

In some embodiments, the acoustic output apparatus 1 may be a bone conduction headphone, and the intercom device 2 and the acoustic output apparatus 1 quickly perform Bluetooth pairing through NFC near field communication to establish a Bluetooth connection, so that the user may achieve intercom through the bone conduction headphone. The bone conduction headphone may release the user's ears when it is worn, and transmit sound through conduction of bones, which may reduce the impact of ambient noise on sound transmission and improve the quality of voice communication. In addition, the audio signals received by the intercom device 2 may be played through the bone conduction headphone or the sound may be picked up by the bone conduction headphone and transmitted to the other intercom device 2 through the intercom device 2, which may avoid the traditional way of external intercom, and is more able to privacy protection. In addition, for application scenarios such as factory workshops, users may also notice changes in the surrounding environment while using the bone conduction headphone for intercom communication, which may protect the safety of users.

In some embodiments, the first NFC module 102 may be a passive NFC module. The first NFC module 102 may store the Bluetooth address of the first Bluetooth module 101, and send the Bluetooth address of the first Bluetooth module 101 to the second NFC module 303. In some embodiments, the first NFC module 102 may also be an active NFC module, which may send the Bluetooth address of the first Bluetooth module 101, and may also receive the Bluetooth address of the second Bluetooth module 302 sent by the second NFC module 303. Similarly, the second NFC module 303 may also be a passive NFC module or an active NFC module.

In some embodiments, the first NFC module 102 may be attached to the battery assembly of the acoustic output apparatus 1, so that the installation is convenient and the structure is simple, and space may also be saved. When a Bluetooth connection is required with the intercom device 2, the position corresponding to the battery assembly of the acoustic output apparatus 1 is close to the communication module 3 on the intercom device 2, and the Bluetooth pairing may be quickly performed.

In order to facilitate the control of the intercom device 2 and the acoustic output apparatus 1, and to automatically realize the switching of the related functions of the intercom device 2 and the acoustic output apparatus 1, sensors may be used to collect information, and based on the information, device control is performed. As shown in FIG. 2, in some embodiments, the acoustic output apparatus 1 may include a sensor assembly 17, and the sensor assembly 17 may be used to detect whether the acoustic output apparatus 1 is being worn. In some embodiments, the sensor assembly 17 may include optical sensors, acceleration sensors, gravity sensors, touch sensors, etc. For example, the sensor assembly 17 includes an optical sensor which may detect whether the acoustic output apparatus 1 is worn by emitting and/or receiving corresponding light signals. For another example, the optical sensor may include a low-light sensor (e.g., an infrared low-light sensor), and the low-light sensor may emit light signals, and the light signals will be reflected (e.g., reflected by the user's skin) when the acoustic output apparatus 1 is worn to generate reflected light, and no reflected light is generated when the acoustic output apparatus 1 is not worn. The low-light sensor may detect whether the acoustic output apparatus 1 is worn or perform a distance measurement by determining whether it receives reflected light or not.

When the acoustic output apparatus 1 and the intercom device 2 are in a Bluetooth connection state and the sensor assembly 17 detects that the acoustic output apparatus 1 is worn, the acoustic output apparatus 1 may be used for picking up sound and/or playing voice, while the intercom device 2 is not used for picking up sound and/or playing voice. That is, when the acoustic output apparatus 1 is worn, the communication system uses the microphone of the acoustic output apparatus 1 to pick up sound and/or the speaker to play voice. When the sensor assembly 17 detects that the acoustic output apparatus 1 is not being worn, the intercom device 2 may be used for picking up sound and/or playing voice, while the acoustic output apparatus 1 is not used for picking up sound and/or playing voice. That is, when the acoustic output apparatus 1 is not worn, the communication system uses the microphone of the intercom device 2 to pick up sound and/or the speaker to play voice.

When the acoustic output apparatus 1 is not worn, the acoustic output apparatus 1 be used to pick up sound or play voice may result in the inability to effectively pick up the sound or the user may not hear the voice transmitted by the acoustic output apparatus 1. At this time, the intercom device 2 may be used to pick up voice and/or play voice, so that the played voice may be heard and/or voice picked up effectively. When the acoustic output apparatus 1 is worn, the acoustic output apparatus 1 may be used to pick up sound and/or play voice, so that the user may send voice or hear the played voice. Whether the acoustic output apparatus 1 is worn may be detected by the sensor assembly 17, so that the communication system may automatically determine the equipment for picking up sound and/or playing voice according to a detection result of the sensor assembly 17, so as to avoid the omission of voice information and improve the operation efficiency of the communication system.

In some embodiments, when the acoustic output apparatus 1 is a bone conduction headphone, it may also be checked whether the bone conduction headphone is worn through a vibration sensor. Specifically, the sensor assembly 17 may include a vibration sensor. When the bone conduction headphone is worn, the headphone core of the bone conduction headphone is in contact with the user's skin, and the vibration of the headphone core may be affected by the mechanical impedance of the skin. When the bone conduction headphone is not worn, the headphone core is not in contact with the user's skin, and the vibration of the headphone core may not be affected by the mechanical impedance of the skin. Therefore, the frequency response curve of the vibration of the headphone core when the bone conduction headphone is worn is different from the frequency response curve of the vibration of the headphone core when it is not worn. Therefore, the frequency response curve of the vibration of the headphone core of the bone conduction headphone may be collected by the vibration sensor, and whether the bone conduction headphone is worn may be determined based on the frequency response curve of the vibration of the headphone core. In some embodiments, the vibration sensors may include displacement sensors, velocity sensors, acceleration sensors, or the like, or combinations thereof, classified according to the parameters measured by the vibration sensors. Different types of sensors may be used for obtaining vibration in different frequency bands of the headphone core. For example, displacement sensors may be used to obtain low frequency (e.g., 20 Hz-80 Hz) vibrations of the headphone core. As another example, velocity sensors may be used to obtain medium frequency (e.g., 80 Hz-1280 Hz) vibrations of the headphone core. For another example, the acceleration sensors may be used to obtain high frequency (e.g., 1280 Hz-2560 Hz) of vibrations of the headphone core. In some embodiments, the vibration sensors may be classified according to the presence or absence of external excitation, and the vibration sensors may include active sensors (requiring external voltage or current excitation), and passive sensors. In some embodiments, the vibration sensors may be classified by measuring vibration directions, and the vibration sensor may include, but are not limited to, single-axis sensors, multi-axis sensors, rotational angular velocity sensors, etc. Different types of the sensors may have different vibration directions. For example, the measurement of a single axis vibration direction may be realized on the single-axis sensors. The measurement of multi-axis vibration direction may be realized on multi-axis sensors and rotational angular velocity sensors. In some embodiments, the types of vibration sensors may include, but are not limited to, piezoelectric sensors, integrated circuit piezoelectric (Integrated Circuits Piezoelectric, ICP) acceleration sensors, microelectromechanical systems (Microelectro Mechanical Systems, MEMS) sensors, etc.

In some embodiments, the vibration sensors may also be used to check whether the bone conduction headphone is worn well, so as to prompt the user to re-wear the bone conduction headphone or adjust the wearing posture etc. Specifically, when the bone conduction headphone is worn well or not, contacts between the headphone core of the bone conduction headphone and the user's skin may be different, resulting in different effects of mechanical impedances of the skin on the vibration of the headphone core. The frequency response curve of the vibration of the headphone core when it is well worn may be different from the frequency response curve of the vibration of the headphone core when it is not well worn. Therefore, the frequency response curve of the vibration of the headphone core of the bone conduction headphone may be collected by the vibration sensor, and it may be judged whether the bone conduction headphone is worn well based on the frequency response curve of the vibration of the headphone core, so as to prompt the user to re-wear the bone conduction headphone or adjust wearing posture, etc.

In some embodiments, a magnitude of a clamping force when the user wears the bone conduction headphone may also be checked by the vibration sensor, so as to adjust the clamping force adaptively, thereby ensuring the comfort of the user when wearing the bone conduction headphone, wherein the clamping force when the user wears the bone conduction headphone may be a pressure of the headphone core on the user's skin. Specifically, the mechanical impedance of the skin may be different due to the different clamping forces of the user's bone conduction headphone, and the different mechanical impedances of the skin may have different effects on the vibration of the headphone core. Therefore, different clamping forces when the user wears the bone conduction headphone may lead to different frequency response curves of the vibration of the headphone core collected by the vibration sensor. The clamping force when the user wears the bone conduction headphone may be judged based on the frequency response curve of the vibration of the headphone core. When the clamping force when the user wears the bone conduction headphone is not within a preset range to ensure the user's comfort, the comfort when the user wears the bone conduction headphone may be ensured by adjusting the clamping force.

In some embodiments, the frequency response curve of the vibration of the headphone core of the bone conduction headphone collected by the vibration sensor may also be applied to perform an EQ adjustment on audio signals input into the bone conduction headphone, so that the user may have a relatively good listening experience. For example, due to the difference in ages, fat and thinness of different users, their skin characteristics may also be different, making the mechanical impedances of the skins inconsistent. When different users wear the same bone conduction headphone, the different mechanical impedances of the skins have different effects on the vibration of the headphone core, and the frequency response curves of the vibration of the headphone core collected by the vibration sensor may be also different, which also makes different users hear different sounds based on the same audio signals wearing the same bone conduction headphone. Therefore, based on the differences between the frequency response curves of the vibration of the headphone core when different users wear the same bone conduction headphone and the frequency response curve of the vibration of the headphone core when the bone conduction headphone outputs an ideal sound, the EQ adjustment may be performed on the audio signals input into the bone conduction headphone to ensure that different users wearing the same bone conduction headphone can hear the same sound or hear a relatively ideal sound based on the same audio signals. As another example, since the skins at different positions of the user may also have different mechanical impedances, when the user repeatedly wears the bone conduction headphone, the position where the headphone core fits the skin may be changed, and the mechanical impedances of the skin at different positions may affect the headphone core. As a result, the sound heard based on the same audio signals may be different when the same user repeatedly wears the bone conduction headphone. Therefore, based on the differences between the frequency response curves of the vibration of the headphone core when the same user repeatedly wears the bone conduction headphone and the frequency response curve of the vibration of the headphone core when the bone conduction headphone outputs an ideal sound, the EQ adjustment may be performed on the audio signals input into the bone conduction headphone to ensure that the same users repeatedly wears the bone conduction headphone can hear the same sound or hear a relatively ideal sound based on the same audio signals.

In some embodiments, an input voltage of the bone conduction headphone may also be checked by the vibration sensor, so as to adjust the input voltage, and the input voltage of the bone conduction headphone may affect the vibration amplitude of the headphone core. The vibration amplitude of the headphone core may be adjusted by adjusting the input voltage of the bone conduction headphone, so as to avoid the excessive vibration amplitude of the headphone core, which may cause discomfort to the user and even damage the user's hearing, and cause damage to the headphone core or that the vibration amplitude of the headphone core is too small to affect the bone conduction efficiency and make the user hear the sound at a lower volume. Specifically, when the bone conduction headphone has different input voltages, the frequency response curves of the vibration of the headphone core collected by the vibration sensor may be different, and the input voltage of the bone conduction headphone may be determined based on the frequency response curve of the vibration of the headphone core. When the input voltage of the bone conduction headphone is too large or too small causes that the vibration amplitude of the headphone core is too large or too small, the vibration amplitude of the headphone core within a range that the user's wearing experience and listening experience may be ensured by adjusting the input voltage.

In some embodiments, the frequency response curve of the vibration of the headphone core of the bone conduction headphone collected by the vibration sensor may also be applied to judge and feedback a physiological state and parameters of the user. Specifically, since the frequency response curves of the vibration of different headphone cores may correspond to different mechanical impedances of the skin, the mechanical impedance of the skin may reflect the physiological state of the human body in a certain extent. Therefore, the mechanical impedance of corresponding skin may be determined based on the frequency response curve of the vibration of the headphone core collected by the vibration sensor, and the physiological state of the user may be judged and fed back based on the mechanical impedance of the skin. For example, it may be determined whether the user is an elderly person and whether the user is fat or thin, etc.

It should be noted that the above descriptions of FIG. 1 and FIG. 2 are provided for illustrative purposes only and are not intended to limit the scope of the application. Numerous changes and modifications will occur to those of ordinary skill in the art in light of the teachings of the present disclosure. However, such changes and modifications do not depart from the scope of the application. For example, one or more elements in the communication system 200 (e.g., the sensor assembly 17, the first Bluetooth module 101, and the first NFC module 102, etc.) may be omitted. In some embodiments, one element may be replaced by other elements that perform similar functions. In some embodiments, an element may be split into a plurality of sub-elements, or the plurality of elements may be combined into a single element.

In some embodiments, in order to enable the user to relatively good perceive external sounds when wearing the acoustic output apparatus 1, the acoustic output apparatus 1 may be suspended on the user's ear by using an ear hook structure so as not to block the user's ear. The acoustic output apparatus 1 may be a bone conduction headphone or an air conduction headphone. When the acoustic output apparatus 1 is an air conduction headphone, the acoustic output apparatus 1 may have a plurality of sound outlet holes, and the sound generated by the acoustic output apparatus 1 may be transmitted to outside through the plurality of sound outlet holes. In some embodiments, the sounds emitted from different sound outlet holes may have different phases (e.g., opposite or nearly opposite phases), and these sounds with different phases may interfere and cancel at a specific spatial location, thereby reducing the sound leakage of the acoustic output apparatus at the specific spatial position. In some embodiments, the acoustic output apparatus 1 may be suspended on the user's left or right ear by adopting a single-sided ear hook structure. In this case, the acoustic output apparatus 1 corresponding to the shape of the user's left ear may be suspended at the position of the user's left ear close to the outer auricle, and the acoustic output apparatus 1 corresponding to the shape of the user's right ear may be suspended at the position of the user's right ear close to the outer auricle. Since there is no physical connection structure between the left ear support structure and the right ear support structure, the user may choose to wear the acoustic output apparatus 1 at the left ear or right ear alone, or wear the acoustic output apparatus 1 from both the left ear and the right ear at the same time. In some embodiments, the acoustic output apparatus 1 may adopt a double-sided ear hook structure and hang on both ears of the user at the same time. At this time, the ear hook structure corresponding to the left ear of the user and the ear hook structure corresponding to the right ear of the user may be fixedly connected through a physical structure (e.g., a back-hook). The specific exemplary structure of the acoustic output apparatus 1 according to the embodiment of the present disclosure will be described in detail below with reference to the accompanying drawings.

Figure 3:
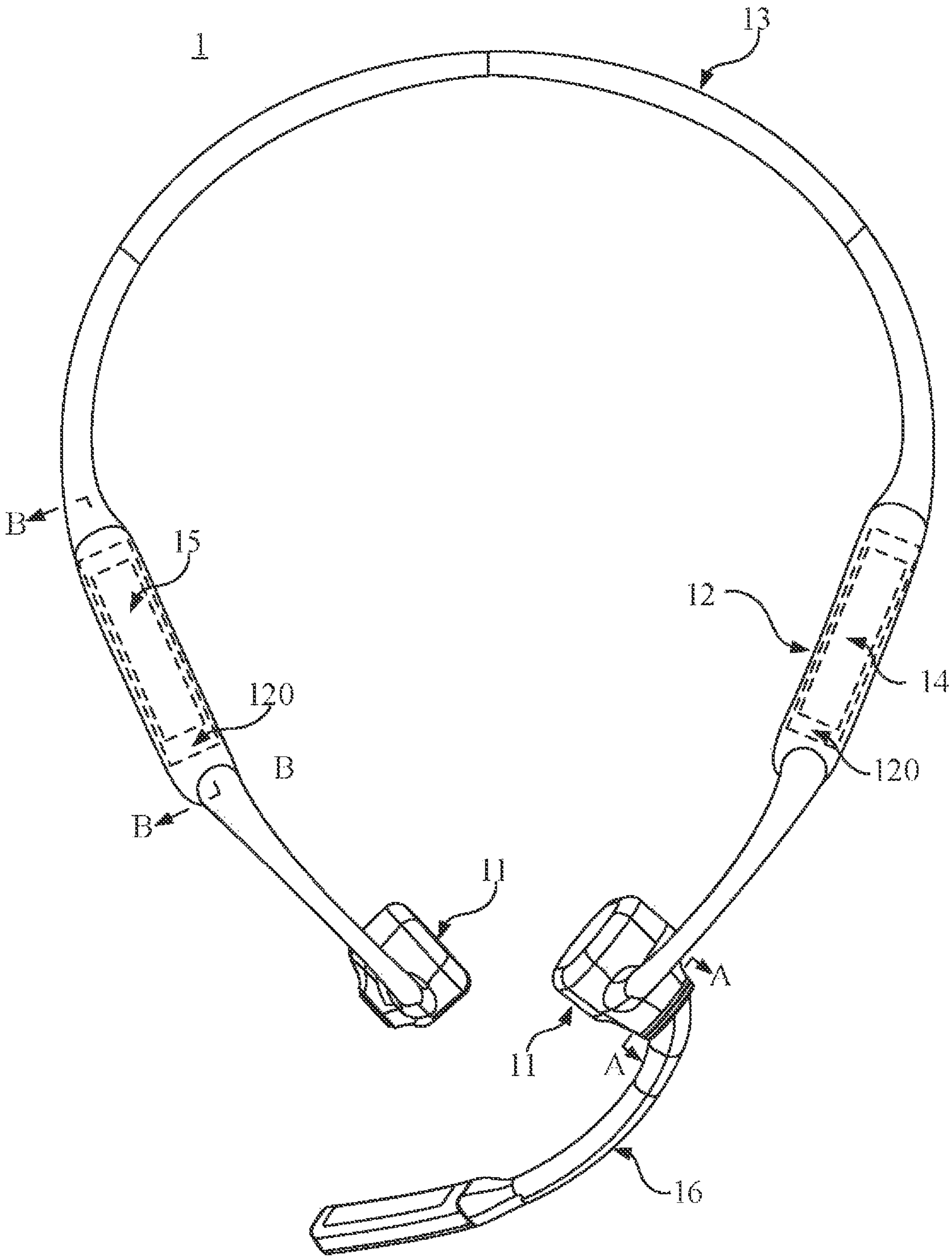
FIG. 3 illustrates a schematic structural diagram of an acoustic output apparatus according to some embodiments of the present disclosure.
Figure 4:
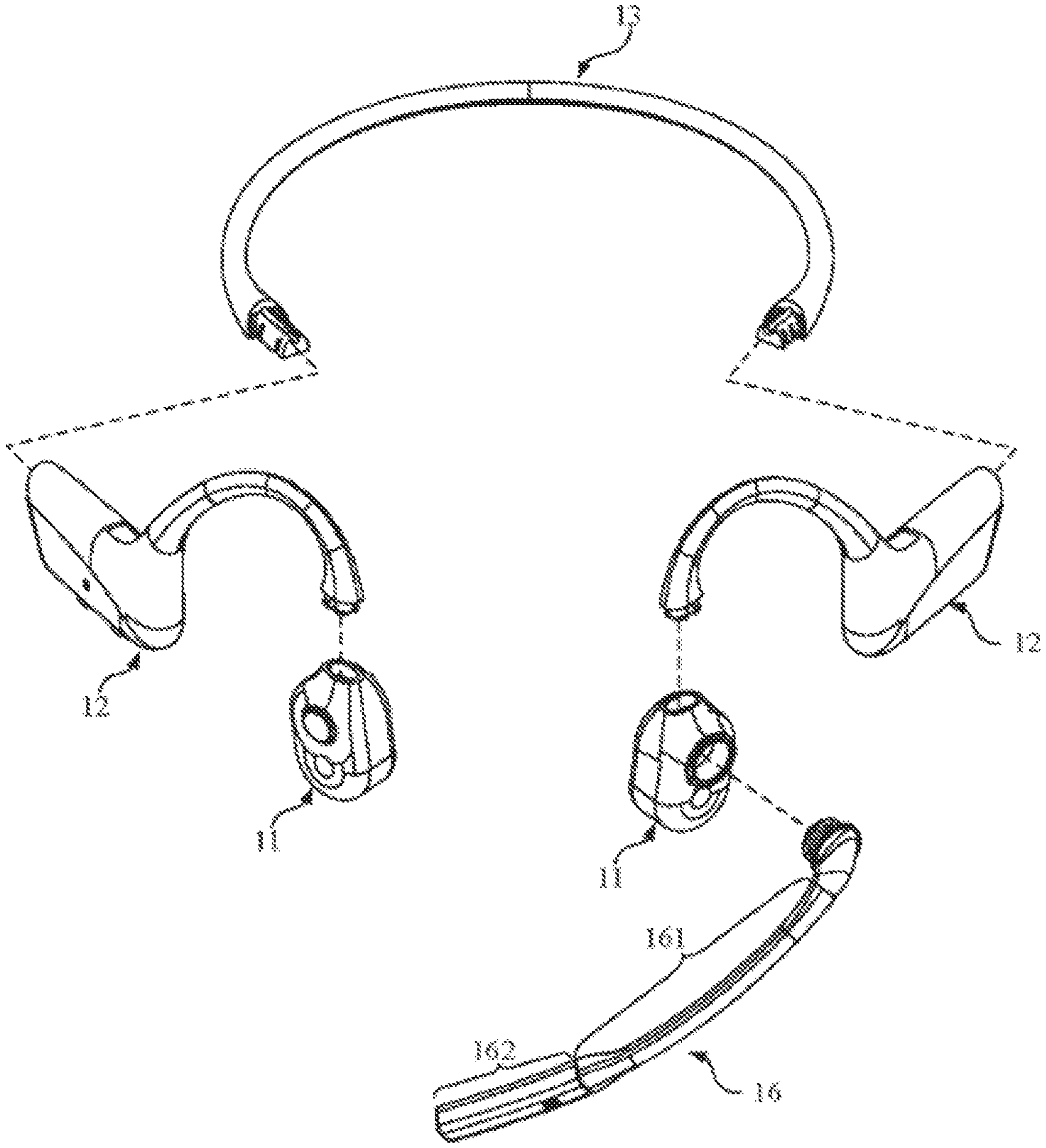
FIG. 4 illustrates a schematic exploded diagram of an acoustic output apparatus according to some embodiments of the present disclosure.

FIG. 3 illustrates a schematic structural diagram of an acoustic output apparatus according to some embodiments of the present disclosure. FIG. 4 illustrates a schematic exploded diagram of an acoustic output apparatus according to some embodiments of the present disclosure. As shown in FIG. 3 and FIG. 4, the acoustic output apparatus 1 adopts a double-sided ear hook structure, which may include two speaker assemblies 11, two ear hook assemblies 12, a rear hook assembly 13 connected between the two ear hook assemblies 12, a battery assembly 14, and a control circuit assembly 15. The speaker assembly 11 may be used to convert an audio signal into a sound signal, wherein the audio signal may be an electrical signal containing sound information sent by a terminal device (e.g., the intercom device 2, a mobile phone, a computer, an MP3, etc. described above) to the acoustic output apparatus 1. The ear hook assembly 12 may be used to accommodate the battery assembly 14 and/or the control circuit assembly 15. The acoustic output apparatus 1 may be suspended on a user's ear by the ear hook assembly 12 and/or the rear hook assembly 13. The battery assembly 14 may be used to power the entire acoustic output apparatus 1. The control circuit assembly 15 may be used to control the operation of the acoustic output apparatus 1 and implement corresponding operations. For example, the control circuit component may control the acoustic output apparatus 1 to start up, shut down, pick up sound, adjust the volume, connect a terminal device for pairing, etc.

In some embodiments, the two speaker assemblies 11 are respectively connected with the two ear hook assemblies 12. The ear hook assemblies 12 may be connected with the rear hook assembly 13 and the speaker assemblies 11. One speaker assembly 11 and one ear hook assembly 12 may be worn on one ear of a user, while the other speaker assembly 11 and the other ear hook assembly may be suspended on the other ear of the user. The ear hook assembly 12 may form with an accommodating space 120, wherein the accommodating space 120 of one ear hook assembly 12 is used to accommodate the battery assembly 14, and the accommodating space 120 of the other ear hook assembly 12 is used to accommodate the control circuit assembly 15.

In some embodiments, the acoustic output apparatus 1 may also not include the rear hook assembly 13, and the speaker assembly 11 and the ear hook assembly 12 suspended on one ear of the user may communicate with the speaker assembly 11 and the ear hook assembly 12 suspended on the other ear by using a wireless connection (e.g., a Bluetooth). The accommodating space 120 of each ear hook assembly 12 may accommodate the battery assembly 14, the control circuit assembly 15, and a Bluetooth module for Bluetooth communication, etc.

In some embodiments, the acoustic output apparatus 1 may also only include a speaker assembly 11, an ear hook assembly 12, a battery assembly 14, and a control circuit assembly 15. The acoustic output apparatus 1 may be worn only on one side of the user's head or suspended on near one of the user's ears. The battery assembly 14 and the control circuit assembly 15 are simultaneously accommodated in the accommodating space 120 of one speaker assembly 11.

In some embodiments, in order to enable the acoustic output apparatus 1 to pick up sound, the acoustic output apparatus 1 may further include one or more microphones. In some embodiments, the one or more microphones may be provided within speaker assembly 11 or ear hook assembly 12.

In some embodiments, the acoustic output apparatus 1 may further include a microphone tube assembly 16, and the microphone tube assembly 16 may be used to pick up sound. The microphone tube assembly 16 may be connected with the speaker assembly 11. In some embodiments, a count of the microphone tube assembly 16 may be one, and the microphone tube assembly 16 may be connected with one of the two speaker assemblies 11. For example, as shown in FIG. 3, the microphone tube assembly 16 may be connected with the speaker assembly 11 corresponding to the battery assembly 14. In some embodiments, the count of microphone tube assemblies 16 may also be two, wherein each speaker assembly 11 may be connected with one microphone tube assembly 16. In some embodiments, the microphone tube assembly 16 may be not required and may be removed from the acoustic output apparatus 1.

In some embodiments, as shown in FIG. 4, the microphone tube assembly 16 may include an elastic connecting rod 161 and a sound pickup assembly 162. One end of the elastic connecting rod 161 may be connected with the speaker assembly 11, and the other end of the elastic connecting rod 161 may be connected with the sound pickup assembly 162. In some embodiments, the sound pickup assembly 162 may include one or more microphones. In some embodiments, a count of microphones of the sound pickup assembly 162 may be greater than or equal to 2, and the plurality of microphones may be arranged at intervals. In some embodiments, the plurality of microphones may be located at an end of the sound pickup assembly 162 away from the speaker assembly 11. In some embodiments, the plurality of microphones may be evenly distributed on sides of sound pickup assembly 162. In some embodiments, one microphone may be located at an end of the sound pickup assembly 162 away from the speaker assembly 11, and other microphones may be located on sides where the sound pickup assembly 162 is connected with the end. In this way, it is convenient for the plurality of microphones to work together, which may reduce noise and improve sound pickup quality.

Figure 6:
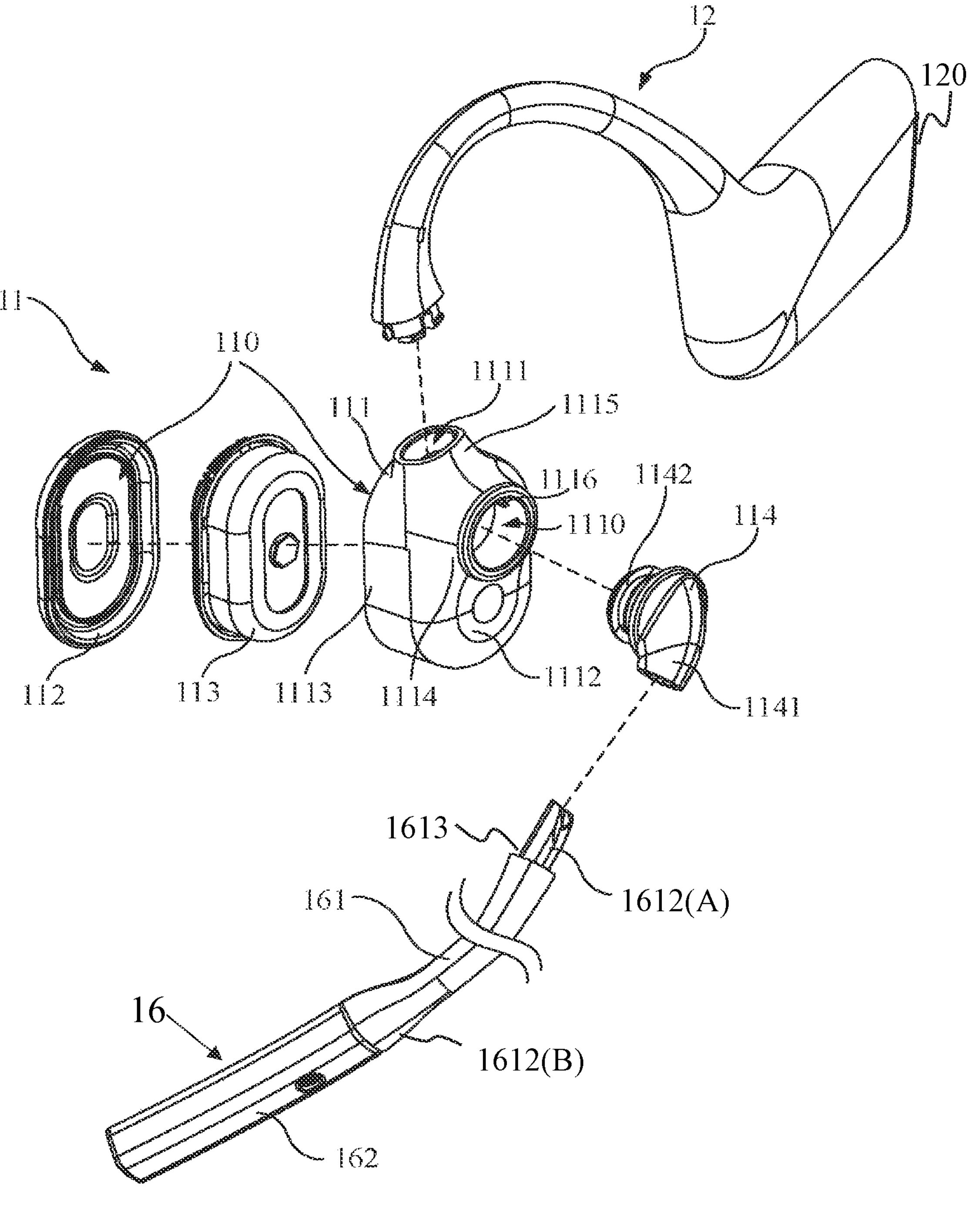
FIG. 6 illustrates a schematic exploded diagram of a speaker assembly according to some embodiments of the present disclosure.

In some embodiments, the acoustic output apparatus 1 may convert a audio signal into a sound signal, that is, when the speaker assembly 11 plays sound, the audio signal corresponding to the sound may make the speaker assembly 11 (the speaker 113 as shown in FIG. 6) generates corresponding vibration, and the vibration may be transmitted to the sound pickup assembly 162 through the elastic connecting rod 161 to cause adverse effects (e.g., echo) on the sound pickup effect of the sound pickup assembly 162. In some embodiments, in order to reduce the adverse effects of the vibration of the speaker assembly 11 on the sound pickup assembly 162, the elastic connecting rod 161 may absorb the vibration transmitted from the speaker assembly 11 to the sound pickup assembly 162. Specifically, the elastic connecting rod 161 may be set so that an average amplitude attenuation rate when the vibration of the voice frequency band generated by the speaker of the speaker assembly 11 is transmitted from one end of the elastic connecting rod 161 to the other end of the elastic connecting rod 161 is not smaller than 35%. It should be understood that the above-mentioned average amplitude attenuation rate may be set to any value, for example, not smaller than 45%, not smaller than 50%, not smaller than 55%, not smaller than 60%, not smaller than 70%, etc.

In actual use, in order to reduce the vibration generated by the speaker assembly 11 of the acoustic output apparatus 1, which may adversely affect the sound pickup effect of the microphone tube assembly 16, the elastic connecting rod 161 may be set so that the average amplitude attenuation rate when the vibration generated by the speaker assembly 11 is transmitted from one end of the elastic connecting rod 161 to the other end of the elastic connecting rod 161 is not smaller than a preset threshold (e.g., 35%, 45%, 50%, 60%, 70%, etc.). In this way, the elastic connecting rod 161 may effectively absorb the vibration during the vibration transmission process to reduce the vibration amplitude transmitted from one end of the elastic connecting rod 161 to the other end. Further, the vibration of the sound pickup assembly 162 caused by the vibration generated by the speaker assembly 11 may be reduced, which may effectively reduce the impact of the vibration of the speaker assembly 11 on the sound pickup effect of the sound pickup assembly 162 and improve the sound pickup quality.

Figure 5:
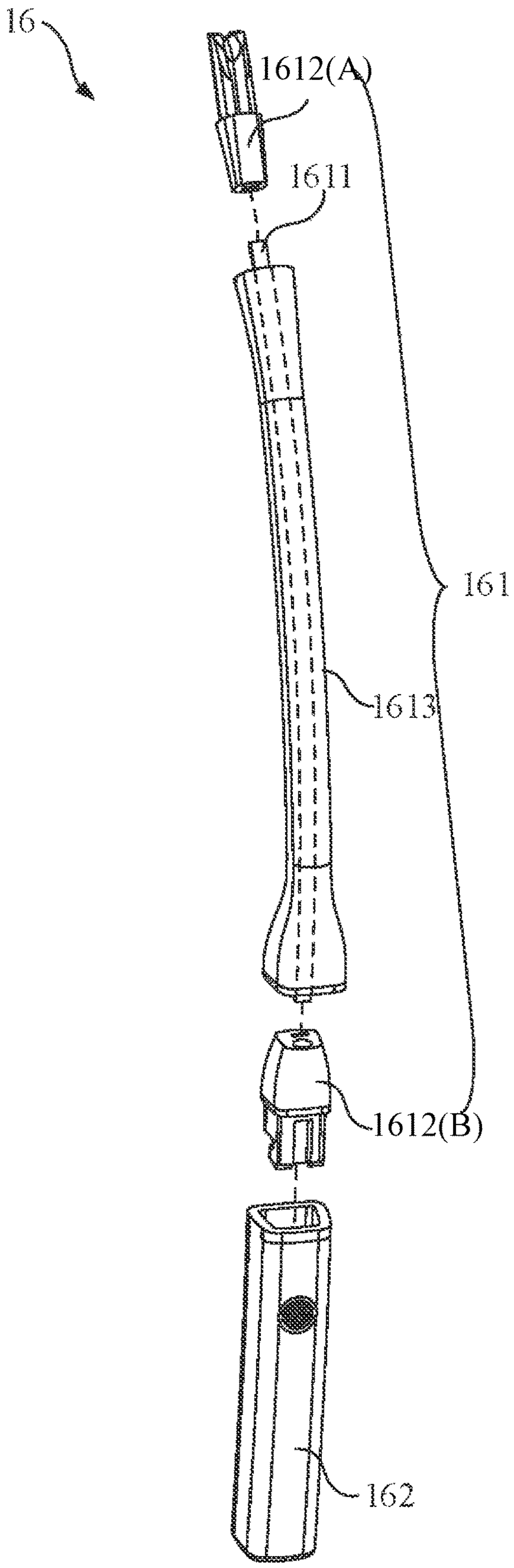
FIG. 5 illustrates a schematic exploded diagram of a microphone tube assembly according to some embodiments of the present disclosure.

FIG. 5 illustrates a schematic exploded diagram of a microphone tube assembly according to some embodiments of the present disclosure. As shown in FIG. 5, in some embodiments, the elastic connecting rod 161 may include a microphone turb elastic wire 1611. Two ends of the microphone turb elastic wire 1611 of are respectively connected with a plug part 1612. One plug part 16128 of the plug parts may be used to be plug-fitted with the sound pickup assembly 162, and the other plug part 1612A may be used to be plug-fitted with the speaker assembly 11 (not shown in FIG. 5). In some embodiments, plug structures of the two plug parts 1612 may be the same or different, which are adapted to the plug structures of the sound pickup assembly 162 and the speaker assembly 11, respectively. For example, the cross-sectional shapes of the plug parts 1612 may be a rectangle, and the plug structures of the sound pickup assembly 162 and the speaker assembly 11 may be corresponding rectangular slots.

In some embodiments, an elastic modulus of the microphone tube elastic wire 1611 may be in the range of 70 GPa-90 GPa. In some embodiments, the elastic modulus of the microphone tube elastic wire 1611 may be in the range of 75 GPa-85 GPa. In some embodiments, the elastic modulus of the microphone tube elastic wire 1611 may be in the range of 80 GPa-84 GPa. In some embodiments, the elastic modulus of the microphone tube elastic wire 1611 may be in the range of 81 GPa-83 GPa. In some embodiments, the material of the microphone tube elastic wire 1611 may be a spring steel, a titanium, other metal material, or other non-metal material. In this embodiment, by setting the elastic modulus of the microphone tube elastic wire 1611 within a specific range (e.g., 70 GPa-90 GPa), the microphone tube elastic wire 1611 may have a good ability to absorb vibration so that the elastic connecting rod 161 can absorb the vibration generated by the speaker assembly 11, so that the requirements of the vibration absorption capacity of the microphone tube assembly 16 may be satisfied, and the adverse effect of the vibration generated by the speaker assembly 11 on the pickup assembly 162 may be reduced, thereby improving the sound pickup quality of the sound pickup assembly 162.

As shown in FIG. 5, the elastic connecting rod 161 may include a microphone tube elastic coating 1613 wrapping a periphery of the microphone tube elastic wire 1611. An elastic modulus of the microphone tube elastic coating 1613 may be in the range of 0.5 Gpa-2 Gpa. In some embodiments, the elastic modulus of the microphone tube elastic coating 1613 may be in the range of 0.8 Gpa-1.5 Gpa. In some embodiments, the elastic modulus of the microphone tube elastic coating 1613 may be in the range of 1.2 Gpa-1.4 Gpa. In some embodiments, the microphone tube elastic coating 1613 may cover a portion of the plug parts 1612, thereby protecting the microphone tube elastic wire 1611 and the plug parts 1612. In some embodiments, the material of the microphone tube elastic coating 1613 may be a silicone, a rubber, a plastic, etc. In some embodiments, the microphone tube elastic coating 1613 may be provided with lead wire channels along its longitudinal direction, and the lead wire channels may be arranged side by side with the microphone tube elastic wire 1611 at intervals. The plug parts 1612 may be provided with buried wire slots for connecting the lead wire channels, and a set of lead wires for connecting the sound pickup assembly 162. The set of the lead wires may enter the lead wire channels of the microphone tube elastic coating 1613 through the buried wire slot of the plug part 1612B adjacent to the sound pickup assembly 162, and then enter the speaker assembly 11 through another plug part 1612A.

By using the microphone tube elastic coating 1613 with a specific elastic modulus range (e.g., 0.5 Gpa-2 Gpa), the vibration transmitted outward by the microphone tube elastic wire 1611 may be further absorbed, which may form a synergistic effect of internal and external vibration absorption. It may greatly improve the effect of the absorbing of the vibration of the microphone tube assembly 16, effectively reduce the vibration transmitted to the sound pickup assembly 162, and improve the sound pickup quality.

FIG. 6 illustrates a schematic exploded diagram of the structure of the speaker assembly according to some embodiments of the present disclosure. As shown in FIG. 6, the speaker assembly 11 may include a first speaker housing 111, a second speaker housing 112, and a speaker 113. The first speaker housing 111 and the second speaker housing 112 may be matched and connected to form a containment space 110 for accommodating the speaker 113. The first speaker housing 111 may be plug-fitted with one end of the elastic connecting rod 161. In some embodiments, in order to adjust the sound pickup position of the microphone tube assembly 16, the microphone tube assembly 16 may be set to be rotated relative to the first speaker housing 111. Specifically, the speaker assembly 11 may include a rotating member 114. The first speaker housing 111 may be provided with a first through hole 1110. The rotating member 114 may be rotatably inserted into the first through hole 1110, and the plug part 1612B of the microphone tube assembly 16 may be plug-fitted with the rotating member 114, so that the microphone tube assembly 16 may be rotated relative to the first speaker housing 111.

In some embodiments, the first speaker housing 111 may be provided with a second through hole 1111 spaced apart from the first through hole 1110. The second through hole 1111 may be used for the ear hook assembly 12 to be plug-fitted, so as to connect the speaker assembly 11 and the ear hook assembly 12. The first through hole 1110 and the second through hole 1111 both communicate with the containment space 110.

Specifically, the first speaker housing 111 may include a bottom wall 1112 and a side wall 1113 that are connected with each other. The side wall 1113 may surround the bottom wall 1112, and the second speaker housing 112 may cover on a side of the side wall 1113 away from the bottom wall 1112 to form the containment space 110 for accommodating the speaker 113. The first through hole 1110 may be formed on the bottom wall 1112, and the second through hole 1111 may be formed on the side wall 1113. The first through hole 1110 may be formed on one side of the bottom wall 1112 adjacent to the second through hole 1111 so that the first through hole 1110 and the second through hole 1111 are adjacent. Specifically, the bottom wall 1112 may have a first convex part 1114 departing from the containment space 110, and the first through hole 1110 may be formed by the first convex part 1114. The side wall 1113 may have a second convex part 1115 departing from the containment space 110, and the second through hole 1111 may be formed by the second convex part 1115. A protruding direction of the first convex part 1114 and a protruding direction of the second convex part 1115 may be approximately perpendicular, and the first convex part 1114 and the second convex part 1115 may be connected in an arc shape. In some embodiments, an angle between the protruding direction of the first convex part 1114 and the protruding direction of the second convex part 1115 may be in the range of 80°-120°. Preferably, the angle between the protruding direction of the first convex part 1114 and the protruding direction of the second convex part 1115 may be in the range of 85°-100°. Further preferably, the angle between the protruding direction of the first convex part 1114 and the protruding direction of the second convex part 1115 may be in the range of 85°-95°.

The protruding directions of the first convex part 1114 and the second convex part 1115 are approximately perpendicular to each other and are connected in an arc shape, which may enhance the structural strength and structural stability of the first speaker housing 111. In addition, when the rotating member 114 is embedded in the first through hole 1110 of the first convex part 1114, the first convex part 1114 may have a corresponding height so that the rotation of the microphone tube assembly 16 may not be disturbed by the first speaker housing 111, the protruding directions of the first convex part 1114 and the second convex part 1115 are approximately perpendicular to each other, which may also reduce the possibility of mutual interference between the ear hook assembly 12 and the microphone tube assembly 16.

In some embodiments, the sound pickup assembly 162 may be connected with other related components on the acoustic output apparatus 1, such as the battery assembly 14 or the control circuit assembly 15 (not shown in FIG. 6), through a set of lead wires used to transmit the acquired audio signal (e.g., the sound picked up by the sound pickup assembly 162) to the related components for subsequent processing. The set of lead wires of the microphone tube assembly 16 may pass through the microphone tube elastic coating 1613 of the elastic connecting rod 161 and be drawn out from the plug part 1612A. The set of lead wires of the microphone tube assembly 16 may pass through the plug part 1612A and then enter the first speaker housing 111. Specifically, the set of lead wires of the microphone tube assembly 16 may pass through the first through hole 1110 and pass through the containment space 110 into the second through hole 1111. The set of lead wires of the microphone tube assembly 16 may further pass through the ear hook assembly 12 and enter the accommodating space 120 from the second through hole 1111 in sequence, and is electrically connected with the battery assembly 14 or the control circuit assembly 15.

In some application scenarios, when the microphone tube assembly 16 rotates relative to the first speaker housing 111 around the first through hole 1110, the set of lead wires of the microphone tube assembly 16 will move. The movement of the set of lead wires may limit the rotation of the microphone tube assembly 16, and the set of lead wires may also transmit the vibration of the speaker assembly 11 to the sound pickup assembly 162, which may affect the sound pickup effect of the sound pickup assembly 162 and the stability of the electrical connection between the set of lead wires and the battery assembly 14 or the control circuit assembly 15. In order to limit the improper movement of the set of the lead wires to avoid the above technical problems, the present disclosure provides the following solutions.

Figure 7:
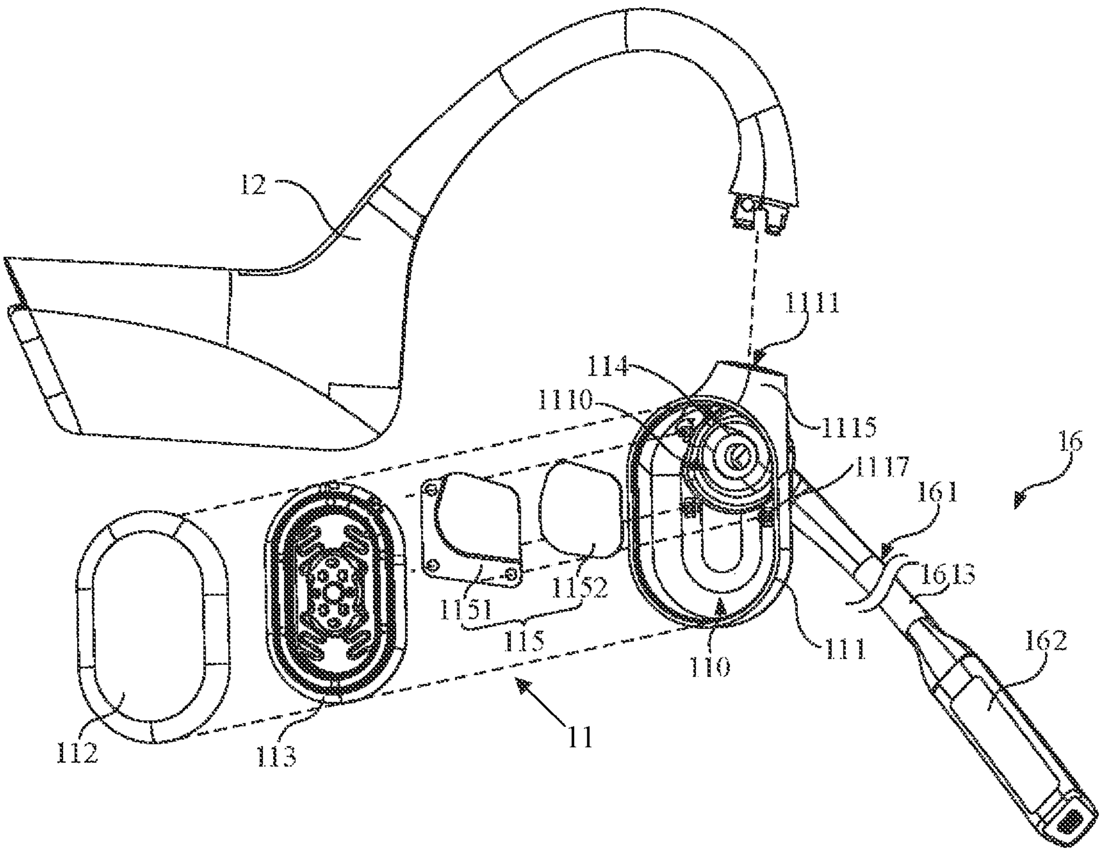
FIG. 7 illustrates a schematic exploded diagram of a speaker assembly according to some embodiments of the present disclosure.

FIG. 7 illustrates a schematic exploded diagram of a speaker assembly according to some embodiments of the present disclosure. As shown in FIG. 7, in some embodiments, the speaker assembly 11 may include a pressing member 115, and the pressing member 115 may be used to press the set of lead wires of the microphone tube assembly 16. Specifically, the pressing member 115 may be disposed in the containment space 110 and cover the first through hole 1110 for pressing the set of lead wires of the microphone tube assembly 16 that passes through the first through hole 1110 to the second through hole 1111. The movable space of the set of lead wires of the microphone tube assembly 16 may be limited, and the shaking or movement of the set of lead wires may be limited by pressing the set of lead wires of the microphone tube assembly 16 by the pressing member 115. Further, the vibration generated by the vibration of the speaker assembly 11 and the vibration transmitted to the sound pickup assembly 162 can be reduced, the sound pickup effect of the sound pickup assembly 162 can be improved, and the stability of the electrical connection can be improved. In addition, the pressing of the set of lead wires by the pressing member 115 may also reduce a friction between the set of lead wires and the first speaker housing 111, thereby protecting the set of lead wires to reduce the wear of the set of lead wires to increase the life of the set of lead wires. It should be noted that the containment space 110 may be formed after the first speaker housing 111 and the second speaker housing 112 are matched and connected, and the containment space 110 is marked at the first speaker housing 111 in FIG. 7 only for the convenience of understanding and description. In addition, since the rotating member 114 is inserted into the first through hole 1110, the first through hole 1110 may be occupied by the rotating member 114. In FIG. 7, the first through hole 1110 is marked at the rotating member 114 also for the convenience of understanding and description.

In some embodiments, the pressing member 115 may include a hard cover plate 1151 and an elastic body 1152 arranged in layers. The hard cover plate 1151 may be farther away from the first through hole 1110 than the elastic body 1152, and the elastic body 1152 may be used to contact the set of lead wires of the microphone tube assembly 16. A hardness of the hard cover plate 1151 may be greater than that of the elastic body 1152. In some embodiments, the hard cover plate 1151 may press the elastic body 1152 so that the elastic body 1152 may contact the set of lead wires, thereby realizing the pressing of the set of lead wires by the pressing member 115. Since the hardness of the hard cover plate 1151 is greater than that of the elastic body 1152, the hard cover plate 1151 with higher hardness may ensure the rigidity of the pressing member 115 to press the set of the lead wires, while the elastic body 1152 with lower hardness may improve the absorption for the movement or vibration of the set of the lead wires, thereby reducing the vibration of the set of the lead wires, and play a role of buffering and protection.

In some embodiments, the first speaker housing 111 may be provided with a plurality of embossments 1117 protruding into the containment space 110 on the periphery of the first through hole 1110, and the plurality of embossments 1117 may be located in the containment space 110. In some embodiments, the plurality of embossments 1117 may be disposed on the periphery of the first through hole 1110 at intervals. In this embodiment, the hard cover plate 1151 may be fixed to the plurality of embossments 1117, and the elastic body 1152 may be disposed between the plurality of embossments 1117. In some embodiments, a count of embossments 1117 may be three, five, six, etc. In some embodiments, the hard cover plate 1151 may be fixed to the plurality of embossments 1117 by screwing, snapping, and gluing, etc. The hard cover plate 1151 may be fixed by the plurality of embossments 1117 disposed on the periphery of the first through hole 1110, and then the elastic body 1152 may be pressed to be in contact with the set of lead wires of the microphone tube assembly 16, so that the stability of the hard cover plate 1151 may be improved to avoid the movement or shaking of the set of lead wires caused by the movement of the hard cover plate 1151, and the stability of the contact between the elastic body 1152 and the set of lead wires can be improved.

In some embodiments, the hard cover plate 1151 may be a steel sheet, and the elastic body 1152 may be foam. In some embodiments, the hard cover plate 1151 may also be other rigid materials, such as a plastic, a ceramic, etc., and the elastic body 1152 may also be other flexible or elastic materials, such as a silica gel, a fiber, etc.

Based on the above description, the vibration of the set of lead wires due to the vibration of the speaker assembly 11 may be reduced, the stability of the set of lead wires during the rotation process of the microphone tube assembly 16 may also be improved, and the set of lead wires of the microphone tube assembly 16 may also be protected by setting the pressing member 115 to press the set of lead wires of the microphone tube assembly 16. In some embodiments, the rotation of the microphone tube assembly 16 also needs to have good stability. The rotation stability of the microphone tube assembly 16 may be improved by the matching structures of the rotating member 114 and the first through hole 1110. An exemplary description of the structure of the rotating member 114 is provided below.

Figure 8:
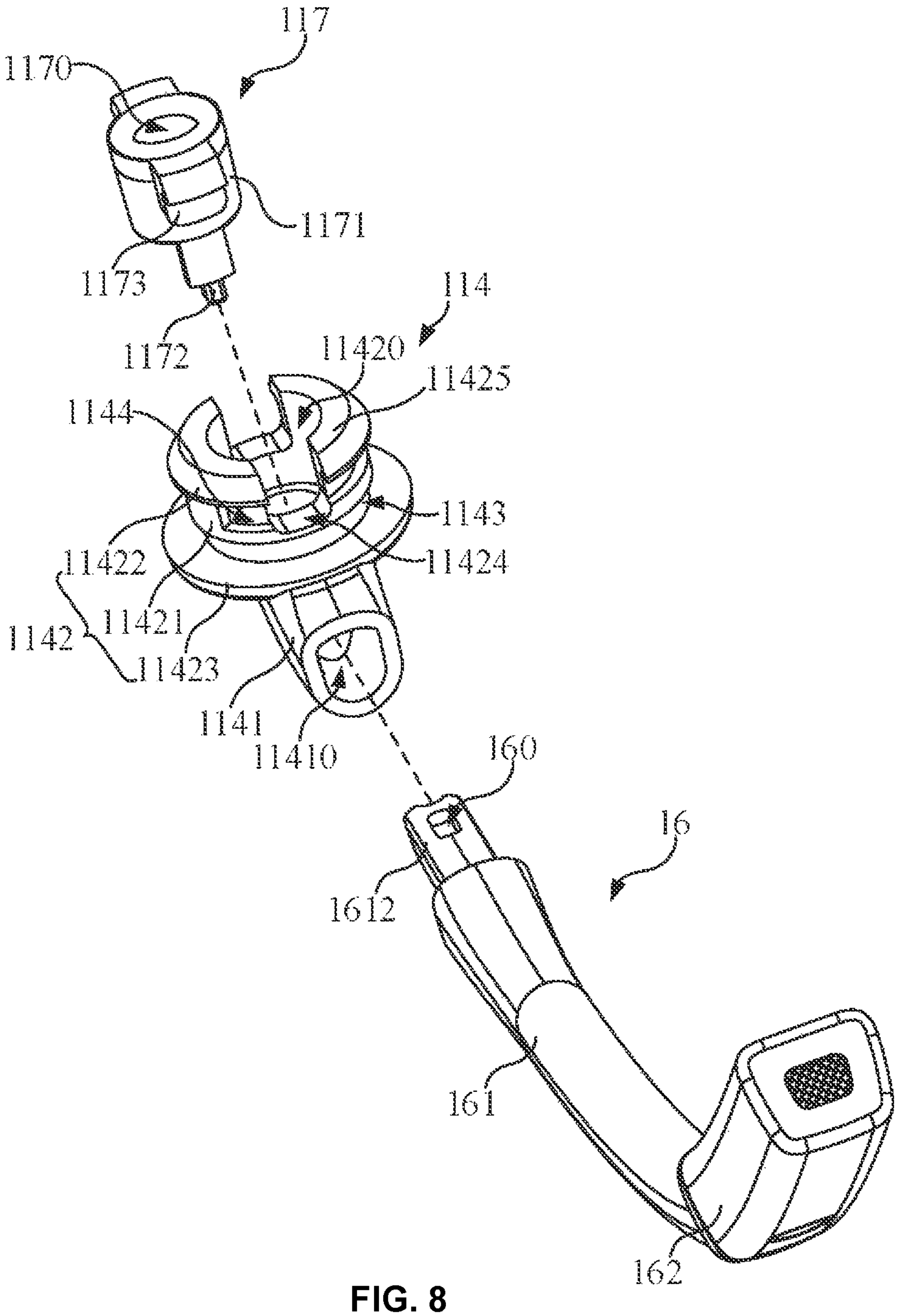
FIG. 8 illustrates a schematic structural diagram of a fixing member, a rotating member, and microphone tube assembly according to some embodiments of the present disclosure.

FIG. 8 illustrates a schematic structural diagram of a fixing member, a rotating member, and a microphone tube assembly according to some embodiments of the present disclosure. As shown in FIG. 8, the rotating member 114 may include a lead part 1141 and a rotating part 1142 that are connected with each other. The lead part 1141 may be connected with the microphone tube assembly 16, and the rotating part 1142 may be embedded in the first through hole 1110 (not shown in FIG. 8) shown in FIG. 6, and rotated relative to the first speaker housing 111 (not shown in FIG. 8). The set of lead wires of the microphone tube assembly 16 may enter the containment space 110 (not shown in FIG. 8) through the lead part 1141 and the rotating part 1142. Specifically, the lead part 1141 may be formed with a first hole 11410, and the rotating part 1142 may be formed with a second hole segment 11420 along an axial direction of the rotating part 1142. The first hole segment 11410 may be communicated with the second hole segment 11420 to form a channel for the set of the lead wires to pass through the rotating member 114. In some embodiments, the plug parts 1612 of the microphone tube assembly 16 may be inserted into the first hole segment 11410 of the lead part 1141 to realize a connection between the lead part 1141 and the microphone tube assembly 16. The set of lead wires of the microphone tube assembly 16 may enter the containment space 110 (not shown in FIG. 8) from the first hole segment 11410 and the second hole segment 11420. In some embodiments, an angle between an extending direction of the first hole segment 11410 and an extending direction of the second hole segment 11420 may be smaller than 180°. In some embodiments, the angle between the extending direction of the first hole segment 11410 and the extending direction of the second hole segment 11420 may be smaller than 150°.

The rotating part 1142 may include a first clamping part 11421, and a second clamping part 11423, the first clamping part 11421 and the second clamping part 11423 may be protruded on both ends of the rotating body 11421 along a radial direction of the rotating member 1142. In some embodiments, the rotating body 11421 may be provided in a cylindrical shape, and a second hole segment 11420 may be opened along the axial direction of the rotating body 11421. In some embodiments, the first clamping part 11422 and the second clamping part 11423 may be disposed on the periphery of the rotating body 11421 arranged in a ring or an open ring. Specifically, the first clamping part 11422 may be farther from the lead part 1141 than the second clamping part 11423.

Figure 9:
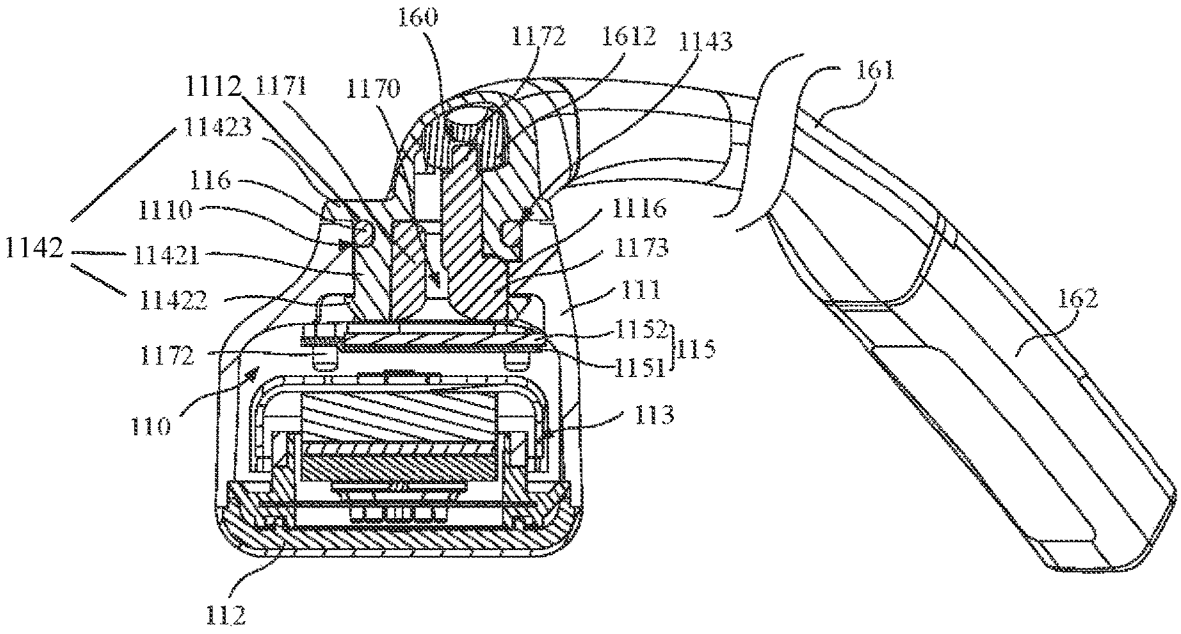
FIG. 9 illustrates a cross-sectional schematic diagram of the speaker assembly and the microphone tube assembly taking A-A as cutting line in FIG. 3.

FIG. 9 illustrates a cross-sectional schematic diagram of the speaker assembly and the microphone tube assembly taking A-A as cutting line in FIG. 3.

As shown in FIG. 9, the rotating body 11421 may be embedded in the first through hole 1110. The first clamping part 11422 and the second clamping part 11423 may be respectively abutted on both sides of the first speaker housing 111 to limit a movement of the rotating part 1142 in the axial direction (i.e., the direction shown by the dotted line in FIG. 8) of the rotating part 1142. Specifically, the first clamping part 11422 and the second clamping part 11423 may be respectively abutted on both sides of the first speaker housing 111 through which the first through hole 1110 penetrates. That is, the first clamping part 11422 may be located on one side inside the containment space 110, and the second clamping part 11423 may be located on the other side outside the containment space 110. The radiuses of the first clamping part 11422 and the second clamping part 11423 may be larger than the radius of the first through hole 1110 to ensure that the first clamping part 11422 and the second clamping part 11423 are respectively abutted on both sides of the first speaker housing 111. The first clamping part 11422 and the second clamping part 11423 provided at both ends of the rotating body 11421 may be respectively abutted on both sides of the first speaker housing 111 to limit a movement of the rotating part 1142 in the axial direction, and the rotating part 1142 may be limited to rotate within the first through hole 1110 to enhance its rotational stability.

As shown in FIG. 8 and FIG. 9, in order to further enhance the rotational stability of the microphone tube assembly 16, the rotating part 1142 may be provided with a damping groove 1143. In some embodiments, the rotating body 11421 may be formed with a damping groove 1143 between the first clamping part 11422 and the second clamping part 11423 along the circumferential direction of the rotating body 11421. The speaker assembly 11 may include a damping member 116 corresponding to the damping groove 1143. The damping member 11 may be arranged in the damping groove 1143 and be in contact with a peripheral wall of the first through hole 1110, so as to provide a rotation damping for the rotating member 11 through a contact friction. The peripheral wall of the first through hole 1110, that is, the bottom wall 1112 may surround a portion of the first through hole 1110. In some embodiments, a plurality of damping grooves 1143 may be formed between the first clamping part 11422 and the second clamping part 11423 along the circumferential direction of the rotating body 11421, and the speaker assembly 11 may include a plurality of damping members 116 corresponding to the plurality of damping grooves 1143. In some embodiments, the damping member 116 may be a rubber member, a plastic member, a silicone member, or other types of materials. In some embodiments, the damping member 116 may be embedded in the damping groove 1143 to provide damping for the rotation of the rotating part 1142 in the first through hole 1110, which may make the rotation of the rotating part 1142 more stable, and enhance the balance and stability of the rotation of the microphone tube assembly 16.

In addition to the rotational stability, the microphone tube assembly 16 also needs to enhance the reliability of rotation. If the microphone tube assembly 16 may be rotated in the same direction without limitation, the set of lead wires of the microphone tube assembly 16 may be entangled or broken. It may also make the rotation of the rotating member 114 more likely to fail, making it difficult to use the rotating member 114 to adjust the angle of the microphone tube assembly 16 subsequently. Therefore, in this embodiment, the rotation range of the microphone tube assembly 16 may be limited in the following manner.

As shown in FIG. 8 and FIG. 9, the rotating part 1142 may be provided with a limit groove 1144, and the peripheral wall of the first through hole 1110 may be protruded with a convex block 1116 embedded in the limit groove 1144. The convex block 1116 may be used to match with the limit groove 1144 to limit the rotation range of the rotating part 1142.

In some embodiments, the rotating body 11421 may form a limit groove 1144 between the first clamping part 11422 and the second clamping part 11423 along the circumferential direction of the rotating body 11421. The limit groove 1144 may be spaced apart from the damping groove 1143. Specifically, the limit grooves 1144 may be spaced apart from the damping grooves 1143 in the axial direction of the rotating body 11421. The limit groove 1144 may be provided in an open ring shape, that is, the angle occupied by the limit groove 1144 may be smaller than 360°, and the length along the circumferential direction of the rotating body 11421 may be smaller than the circumference of the rotating body 11421. In some embodiments, the angle occupied by the limit groove 1144 may be determined according to actual needs. The angle occupied by the limit groove 1144 may limit the rotation range of the rotating part 1142 (i.e., the maximum angle that the microphone tube assembly 16 rotates in a same direction). For example, when the angle occupied by the limit groove 1144 is 270°, the maximum angle that the microphone tube assembly 16 rotates in the same direction may be 270°.

The peripheral wall of the inner side of the first through hole 1110 may be protruded with a convex block 1116 (also shown in FIG. 6). The convex block 1116 may be embedded in the limit groove 1144. When the rotating part 1142 rotates relative to the first speaker housing 111, the two ends of the limit groove 1144 may change their positions relative to the convex block 1116 as the rotating part 1142 rotates. When the limit groove 1144 rotates until one end of the limit groove 1144 abuts against the convex block 1116, the convex block 1116 may limit the rotating part 1142 from continuing to rotate in the current rotational direction, that is, the convex block 1116 may abut on both ends of the limit groove 1144 to limit the rotation range of the rotating part 1142. In some embodiments, the rotation range of the rotating part 1142 may be smaller than 360°, e.g., 300°, 270°, 240°, 180°, and 90°, etc. It should be noted that the rotation range of the rotating part 1142 is not limited to the above-mentioned angular range, and may be adaptively adjusted according to an actual situation, which will not be further described here.

The limit groove 1144 provided by the rotating body 11421 may match with the convex block 1116 provided on the peripheral wall of the first through hole 1110, so that the convex block 1116 may abut on both ends of the limit groove 1144, thereby effectively limiting the rotation range of the rotating part 1142. This also allows the microphone tube assembly 16 to rotate within a certain range, rather than unrestrictedly rotating in the same direction, which may improve the reliability of the rotation of the microphone tube assembly 16, reduce the failure probability of the microphone tube assembly 16, and improve the service life of the acoustic output apparatus 1.

As shown in FIG. 8 and FIG. 9, in order to reduce the occurrence of the microphone tube assembly 16 inserted in the first hole segment 11410 falling off or being pulled out, the speaker assembly 11 may include a fixing member 117. The fixing member 117 may be used to fix the microphone tube assembly 16 inserted in the first hole segment 11410 to limit the movement of the microphone tube assembly 16. In some embodiments, one end of the microphone tube assembly 16 for being inserted into the first hole segment 11410 may be provided with a fixing hole 160. Specifically, the fixing member 117 may include a fixing body 1171 and a plug pin 1172 arranged at one end of the fixing body 1171. The fixing body 1171 may be inserted into the second hole segment 11420, and the plug pin 1172 may be inserted into the fixing hole 160 to limit the movement of the microphone tube assembly 16. In addition, the fixing body 1171 may be also provided with corresponding lead wire holes 1170 along longitudinal direction of the fixing body 1171, so as to communicate with the second hole segment 11420 and the containment space 110. The set of lead wires of the microphone tube assembly 16 may enter the containment space 110 through the corresponding lead wire holes 1170 on the fixing body 1171.

In some embodiments, notches 11424 may be formed at one end of the rotating part 1142 away from the lead part 1141, and the notches 11424 may communicate with the second hole segment 11420. The fixing member 117 may include bosses 1173 protruding from the periphery of the fixing body 1171. The bosses 1173 may be embedded in the notches 11424 and supported in the notches 11424. In this way, the rotating body 11421 may be supported to be stably accommodated in the second hole segment 11420. In some embodiments, a count of the notches 11424 may be at least two, and one end of the rotating part 1142 away from the lead part 1141 may be divided into at least two sub-components 11425 spaced apart from each other along the circumferential direction of the rotating part 1142. A count of the bosses 1173 may correspond to the count of the notches 11424. That is, the notches 11424 may penetrate the circumference of the rotating body 11421, and further divide the end of the rotating part 1142 away from the lead part 1141 into a corresponding count of sub-components 11425 in the circumferential direction of the rotating part 1142. In some embodiments, the shapes of the notches 11424 may be a regular or an irregular shape such as a rectangle, an arc, and a V shape, etc., and the shapes of the bosses 1173 corresponds to the shapes of the notches 11424.

In some embodiments, the end of the rotating part 1142 may be divided into at least two sub-components 11425 by setting the notches 11424, so that the difficulty of embedding the rotating part 1142 into the first through hole 1110 can be reduced, and the assembly efficiency can be improved. Meanwhile, the embedment of the bosses 1173 into the notches 11424 can enhance the structural reliability and strength of the rotating part 1142.

In some embodiments, the count of the notches 11424 may be two and disposed opposite to each other. The count of the bosses 1173 may be correspondingly two and may be opposite to each other. The two bosses 1173 may be correspondingly embedded in the two notches 11424, so that the fixing member 117 may be supported between the two sub-components 11425. Further, the two bosses 1173 may be embedded in the two notches 11424, so that the fixing member 117 and the end of the rotating part 1142 away from the lead part 1141 may be complementary to form a complete annular structure. In some embodiments, the count of the notches 11424 may be greater than two and uniformly arranged along the circumferential direction of the rotating part 1142, and correspondingly, the count of the bosses 1173 may be greater than two and uniformly arranged along the axial direction of the fixing body 1171. It should be noted that the count of the notches 11424 are not limited to the two shown in FIG. 8, but may also be three, four or more. Correspondingly, the count of the bosses 1173 may be set according to the count of the notches 11424.

Based on the above description, the first through hole 1110 of the speaker assembly 11 may be used to plug-fitted with the microphone tube assembly 16, and the second through hole 1111 may be used to the plug-fitted of the ear hook assembly 12. The set of lead wires of the microphone tube assembly 16 may enter the containment space 110 of the speaker assembly 11 from the first through hole 1110 and passes through the second through hole 1111 into the accommodating space 120 of the ear hook assembly 12. The ear hook assembly 12 will be described in detail below.

Figure 10:
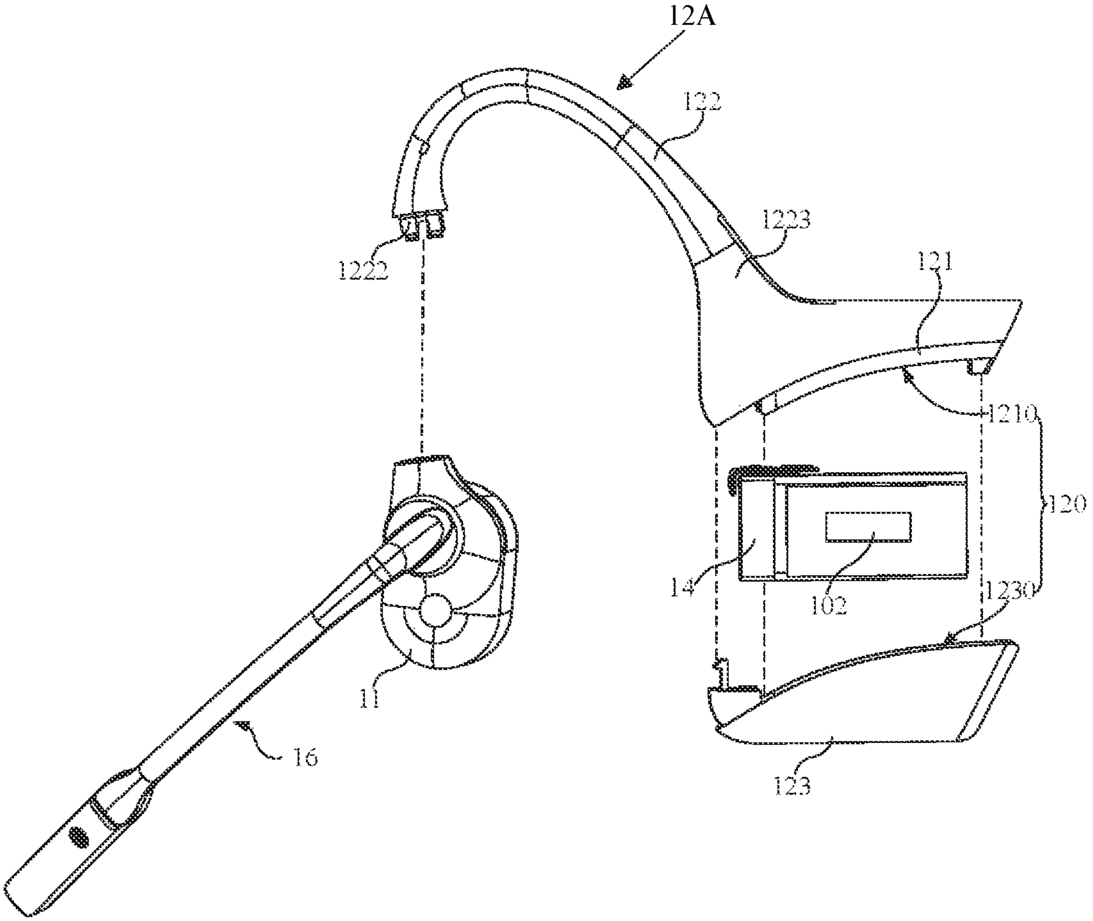
FIG. 10 illustrates a schematic exploded diagram of an ear hook assembly according to some embodiments of the present disclosure.
Figure 11:
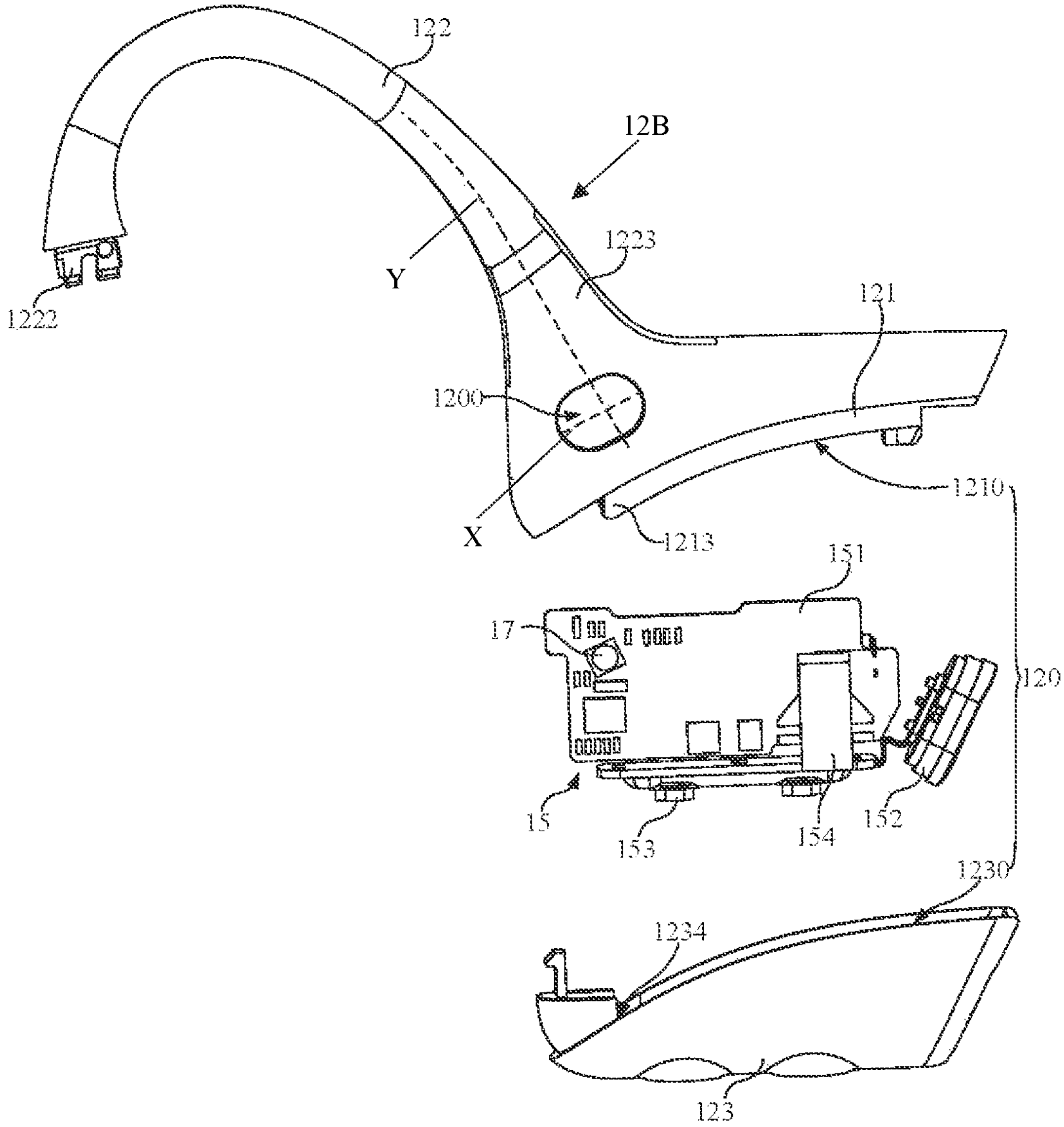
FIG. 11 illustrates another exploded schematic diagram of an ear hook assembly according to some embodiments of the present disclosure.

FIG. 10 illustrates a schematic exploded diagram of an ear hook assembly 12A according to some embodiments of the present disclosure. FIG. 11 illustrates another exploded schematic diagram of an ear hook assembly 12A according to some embodiments of the present disclosure. As shown in FIG. 10, the ear hook assembly 12A may include an ear hook housing and a connecting part 122. The ear hook housing may have an accommodating space 120 for accommodating the battery assembly 14. Specifically, the ear hook housing may include a first ear hook housing 121 and a second ear hook housing 123, and the connection of the first ear hook housing 121 and the second ear hook housing 123 may form an accommodating space 120.

As shown in FIG. 10, the battery assembly 14 may include a battery housing (not shown) and a battery cell (not shown) disposed in the battery housing, and the battery cell may be used to store electricity. In some embodiments, the first NFC module 102 shown in FIG. 2 may be attached to the battery assembly 14, such as attached to the battery housing, so that the volume of the acoustic output apparatus 1 may be reduced, and the electromagnetic interference or signal interference between the first NFC module 102 and the control circuit assembly 15 may also be reduced.

FIG. 11 illustrates another exploded schematic diagram of an ear hook assembly 12B according to some embodiments of the present disclosure. The ear hook assembly 12B may be substantially similar to the ear hook assembly 12A, with the exception of some features and elements. As shown in FIG. 11, the accommodating space 120 of the ear hook assembly 12B may be used to accommodate the control circuit assembly 15. In some embodiments, when the acoustic output apparatus 1 includes two ear hook assemblies 12, one ear hook assembly 12 similar to the ear hook assembly 12A shown in FIG. 10 may be used to accommodate the battery assembly 14, and the other ear hook assembly 12 similar to the ear hook assembly 12B shown in FIG. 11 may be used to accommodate the control circuit assembly 15. In some embodiments, when the acoustic output apparatus 1 includes only one ear hook assembly 12, the accommodating space 120 of the ear hook assembly 12 may be used to accommodate the battery assembly 14 and the control circuit assembly 15 at the same time.

As shown in FIG. 11, the control circuit assembly 15 may include a circuit board 151, a power interface 152, a button 153, and an antenna 154, etc. In some embodiments, the control circuit assembly 15 may also integrate other circuits and components. For example, the first Bluetooth module 101 described in FIG. 2 may be integrated on the control circuit assembly 15 (e.g., the circuit board 151). for As another example, the sensor assembly 17 may also be integrated on the circuit board 151. In some embodiments, the sensor assembly 17 may be located within the speaker assembly 11. For example, when the sensor assembly 17 includes a vibration sensor, the vibration sensor may be integrated on the speaker 113 to detect vibration information of the speaker 113.

In some embodiments, the sensor assembly 17 shown in FIG. 11 may include an optical sensor. The first ear hook housing 121 may form a window 1200 for transmitting the optical signal of the optical sensor. The window 1200 may be disposed adjacent to the connecting part 122 so that the window 1200 is positioned adjacent to a base of a wearer's ear when the acoustic output apparatus 1 is worn. In some embodiments, the windows 1200 may be arranged in a racetrack shape as shown in FIG. 11. In some embodiments, the window 1200 may also have any shape, such as a circular, a rectangular, etc. In some embodiments, an extension of the central axis of the connecting part 122 (labeled as dashed a line X in FIG. 11) may intersect a long axis of window 1200 (labeled as a dashed line Y in FIG. 11). The window 1200 may be effectively positioned adjacent to a base of a wearer's ear by setting the extension of the central axis of the connecting part 122 to intersect with the long axis of the window 1200, thereby improving the sensitivity of the sensor assembly 17 and the effectiveness of detection.

In some embodiments, the sensor assembly 17 may include a vibration sensor, and the vibration sensor may be used to check whether the acoustic output apparatus 1 is worn, whether it is worn well, a clamping force when the user wears the acoustic output apparatus 1, an input voltage of the acoustic output apparatus 1, etc. More descriptions about the vibration sensor may be found elsewhere in this application and will not be repeated here.

At present, the acoustic output apparatus 1 is developing in the direction of portability and volume miniaturization. A portion of the ear hook assembly 12 used to accommodate the battery assembly 14 or the control circuit assembly 15 and related wirings, etc. is often a portion of the acoustic output device 1 with a larger volume, and the design of the relevant buckle position and the buckle structure in the ear hook assembly 12 may affect the volume of the entire ear hook assembly 12. In order to reduce the volume of the ear hook assembly 12, the present embodiment provides the following housing structure of the ear hook assembly.

Figure 12:
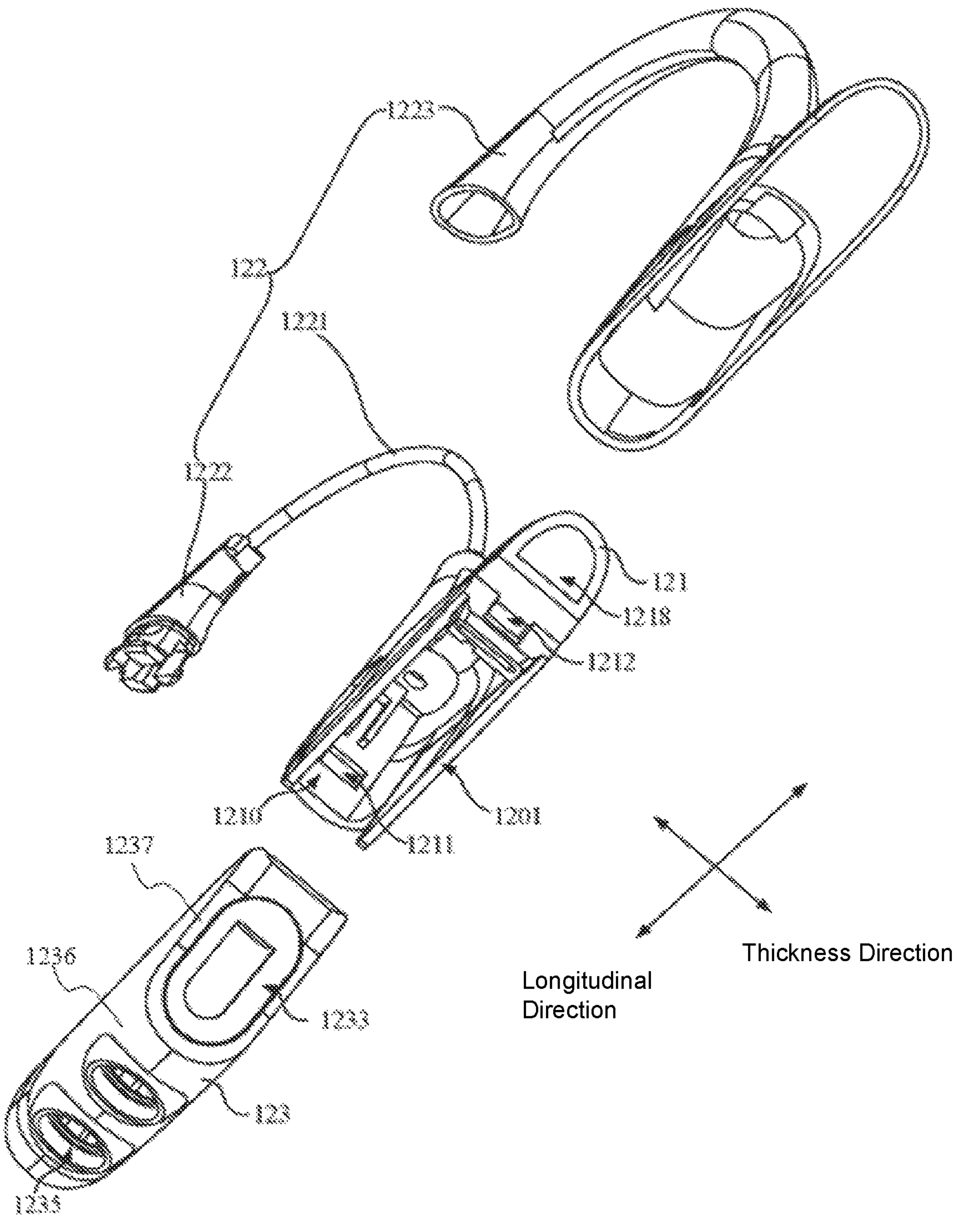
FIG. 12 illustrates a schematic diagram of a split structure of a first ear hook housing and a second ear hook housing according to some embodiments of the present disclosure.
Figure 13:
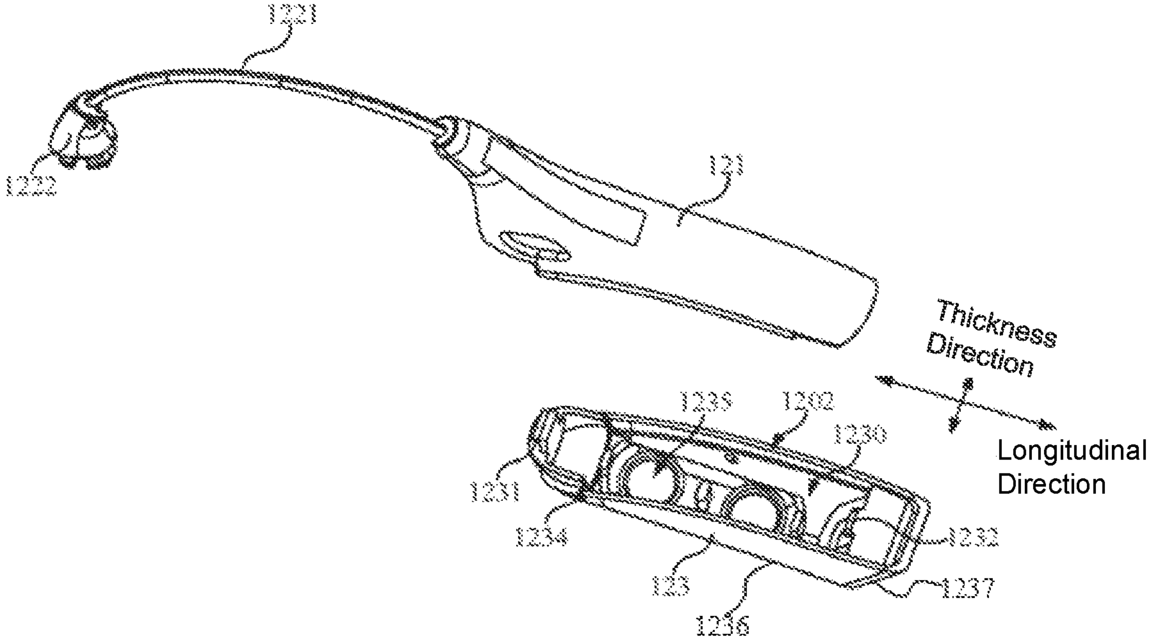
FIG. 13 illustrates another schematic diagram of a split structure of a first ear hook housing and a second ear hook housing according to some embodiments of the present disclosure.
Figure 14:
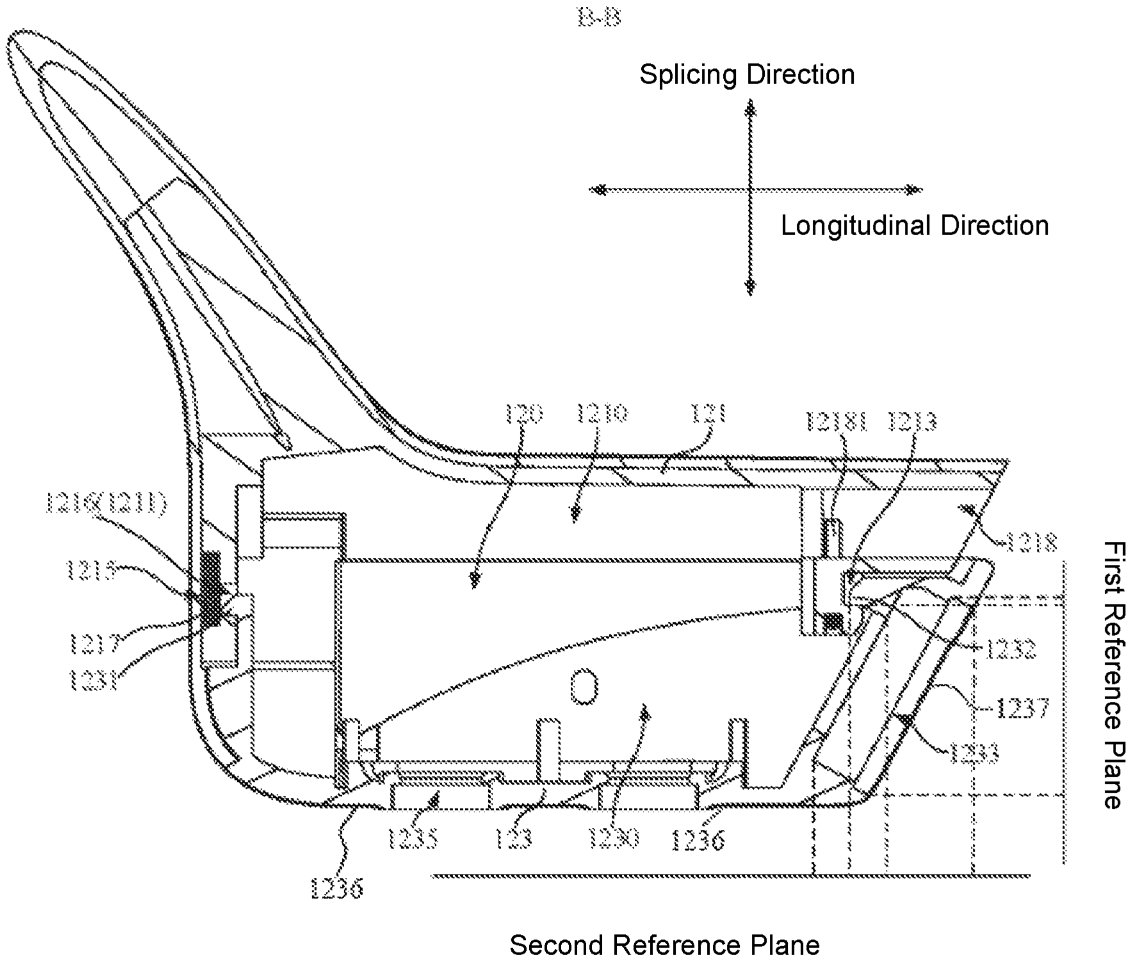
FIG. 14 illustrates a cross-sectional schematic diagram of the ear hook housing taking B-B as cutting line in FIG. 3.

FIG. 12 illustrates a schematic diagram of a split structure of a first ear hook housing and a second ear hook housing according to some embodiments of the present disclosure. FIG. 13 illustrates another schematic diagram of a split structure of a first ear hook housing and a second ear hook housing according to some embodiments of the present disclosure. FIG. 14 illustrates a cross-sectional schematic diagram of the ear hook housing taking B-B as cutting line in FIG. 3. FIG. 12 shows the internal structure of the first ear hook housing 121, and FIG. 13 shows the internal structure of the second ear hook housing 123. In FIG. 14, the first ear hook housing 121 and the second ear hook housing 123 are assembled to form the ear hook housing. After the first ear hook housing 121 and the second ear hook housing 123 are assembled, an accommodating space 120 may be formed (not shown in FIG. 12 and FIG. 13, and shown in FIG. 14). Specifically, the accommodating space 120 may have mutually perpendicular longitudinal direction and thickness direction as shown in FIG. 12 and FIG. 13. It should be noted that, in the following content, unless otherwise specified, the longitudinal direction refers to the longitudinal direction of the accommodating space 120, and the thickness direction refers to the thickness direction of the accommodating space 120. As shown in FIG. 14, the first ear hook housing 121 and the second ear hook housing 123 may be spliced with each other along a splicing direction perpendicular to the longitudinal direction and the thickness direction to form the ear hook housing, thereby forming the accommodating space 120. For example, the first ear hook housing 121 may have a first sub-accommodating space 1210 (shown in FIG. 12 and FIG. 14), and the second ear hook housing 123 may have a second sub-accommodating space 1230 (shown in FIG. 13 and FIG. 14). After the first ear hook housing 121 and the second ear hook housing 123 are spliced together, the first sub-accommodating space 1210 and the second sub-accommodating space 1230 are combined to form the accommodating space 120.

In some embodiments, the first ear hook housing 121 may include a first stuck slot 1211 and a second stuck slot 1212 (shown in FIG. 12 and FIG. 14) spaced apart, and the second ear hook housing 123 may include a first stuck block 1231 and a second stuck block 1232 (shown in FIG. 13 and FIG. 14) that are spaced apart. The first stuck slot 1211 may be clamped-fitted with the first stuck block 1231, and the second stuck slot 1212 may be clamped-fitted with the second stuck block 1232, so that the first ear hook housing 121 may be clamped-fitted with the second ear hook housing 123 to form the ear hook housing. In some embodiments, the first ear hook housing 121 may include a first stuck block 1231 and a second stuck block 1232 arranged at intervals, and the second ear hook housing 123 may include a first stuck slot 1211 and a second stuck slot 1232 arranged at intervals. In some embodiments, the first ear hook housing 121 may include a first stuck block 1231 and a second stuck slot 1212 arranged at intervals, and the second ear hook housing 123 may include a first stuck slot 1211 and a second stuck block 1232 arranged at intervals.

In some embodiments, the first ear hook housing 121 may be spaced along the longitudinal direction to form the first stuck slot 1211 and the second stuck slot 1212 with the same opening direction, that is, the openings of the first stuck slot 1211 and the second stuck slot 1212 face the same direction. The second ear hook housing 123 protrudes along the longitudinal direction with the first stuck block 1231 and the second stuck block 1232 extending in the same direction, that is, the first stuck block 1231 is spaced apart from the second stuck block 1232 in the longitudinal direction, and both bulge in a same direction (i.e., face in the same direction), which enables the first stuck block 1231 and the second stuck block 1232 to be respectively embedded in the first stuck slot 1211 and the second stuck slot 1212 in the same direction. As shown in FIG. 14, the first stuck block 1231 may be embedded in the first stuck slot 1211, and the second stuck block 1232 may be embedded in the second stuck slot 1212 to limit the relative movement of the first ear hook housing 121 and the second ear hook housing 123 in the splicing direction and the thickness direction. In some embodiments, the first ear hook housing 121 may be spaced along the width direction to form the first stuck slot 1211 and the second stuck slot 1212 with a same opening direction. The second ear hook housing 123 may be protruded with the first stuck block 1231 and the second stuck block 1232 extending in a same direction along the width direction. In some embodiments, the first ear hook housing 121 may be further formed with a third stuck slot and a fourth stuck slot along the longitudinal direction or the width direction. Correspondingly, the second ear hook housing 123 may be further formed with a third card block and a fourth card block along the longitudinal direction or the width direction. The present disclosure does not limit a count of the stuck slots and the stuck blocks on the first ear hook housing 121 and the second ear hook housing 123.

In some embodiments, a splicing edge 1201 (shown in FIG. 12) of the first ear hook housing 121, and a splicing edge 1202 (shown in FIG. 13) of the second ear hook housing 123 may fit each other, so as to limit the relative movement of the first ear hook housing 121 and the second ear hook housing 123 in the longitudinal direction. The splicing of the first ear hook housing 121 and the second ear hook housing 123 may mean that the splicing edge 1201 of the first ear hook housing 121 and the splicing edge 1202 of the second ear hook housing 123 are substantially in contact and connected. Wherein, as shown in FIG. 12, the splicing edge 1201 of the first ear hook housing 121 may refer to an edge of the first ear hook housing 121 facing the second ear hook housing 123, which is used to splice with the second ear hook housing 123. As shown in FIG. 13, the splicing edge 1202 of the second ear hook housing 123 may refer to an edge of the second ear hook housing 123 facing the side of the first ear hook housing 121, which is used to splice with the first ear hook housing 121.

In some embodiments, a shape of the splicing edge 1201 of the first ear hook housing 121 may conform to a shape of the splicing edge 1202 of the second ear hook housing 123, and the shapes of the splicing edge 1201 and the splicing edge 1202 may conform or complement each other, thereby forming a stable matching structure, which can limit the relative movement of the splicing edge 1201 and the splicing edge 1202 in the longitudinal direction. In some embodiments, at least two positioning holes may be provided on the splicing edge 1201 of the first ear hook housing 121, and at least two positioning posts may be provided on the splicing edge 1202 of the second ear hook housing 123. By inserting the positioning posts into the positioning holes, not only the splicing of the first ear hook housing 121 and the second ear hook housing 123 may be completed to form a stable matching structure, but also the situation of splicing dislocation may be avoided.

If the first stuck block 1231 and the second stuck block 1232 are set to protrude in opposite directions respectively, the space occupied by the first stuck block 1231 and the second stuck block 1232 may be increase, the first stuck slot 1211 and the second stuck slot 1212 need to increase a distance in the longitudinal direction to cover the first stuck block 1231 and the second stuck block 1232. In the embodiment of the present disclosure, the matching direction of the first stuck block 1231 and the first stuck slot 1211 and the matching direction of the second stuck block 1232 and the second stuck slot 1212 may be the same by setting the first stuck slot 1211 and the second stuck slot 1212 with the same opening direction and the first stuck block 1231 and the second stuck block 1232 with the same extending direction. Such a design may reduce the additional volume occupied by the first stuck block 1231 and the second stuck block 1232. Further, the volume occupied by the matching of the first stuck block 1231 and the first stuck slot 1211 and the matching of the second stuck block 1232 and the second stuck slot 1212 may be reduced. In addition, by using the splicing edge 1201 of the first ear hook housing 121 and the splicing edge 1202 of the second ear hook housing 123 to fit each other, there is no need to provide additional structures such as buckles, protrusions, etc., so that the structure of the ear hook assembly 12 may be more compact and the volume of the ear hook assembly 12 may also be reduced At the same time, through the cooperation of the first stuck block 1231 and the second stuck block 1232 with the first stuck slot 1211 and the second stuck slot 1212, respectively, and the displacement of the first ear hook housing 121 and the second ear hook housing 123 in the splicing direction and the thickness direction may be limited to make the splicing of the first ear hook housing 121 and the second ear hook housing 123 more stable and the structure more reliable.

As shown in FIG. 12, the first stuck slot 1211 and the second stuck slot 1212 may be located on both sides of the first ear hook housing 121 along the longitudinal direction, respectively. The opening direction of the first stuck slot 1211 may face the accommodating space 120, and the opening direction of the second stuck slot 1212 may depart from the accommodating space 120, that is, the opening direction of the first stuck slot 1211 may face the first sub-accommodating space 1210, and the opening direction of the second stuck slot 1212 may depart from the first sub-accommodating space 1210. In some embodiments, the first stuck slot 1211 may be formed on the side of the first ear hook housing 121 close to the connecting part 122, and the second stuck slot 1212 may be formed on the side of the first ear hook housing 121 away from the connecting part 122.

As shown in FIG. 13, the first stuck block 1231 and the second stuck block 1232 may be located on both sides of the second ear hook housing 123 along the longitudinal direction, respectively. The extending direction of the first stuck block 1231 may depart from the accommodating space 120, and the extending direction of the second stuck block 1232 may be toward the accommodating space 120. That is, the extending direction of the first stuck block 1231 may depart from the second sub-accommodating space 1230, and the extending direction of the second stuck block 1232 may be toward the second sub-accommodating space 1230. Correspondingly, the first stuck block 1231 may be disposed on the side of the second ear hook housing 123 close to the connecting part 122, and the second stuck block 1232 may be disposed on the side of the second ear hook housing 123 away from the connecting part 122. Compared with the protruding extension toward the accommodating space 120, the protruding extension into the accommodating space 120 of the second stuck block 1232 may prevent the second stuck block 1232 from occupying additional space, thereby saving corresponding space. The second stuck slot 1212 may be located in front of the extending direction of the second stuck block 1232 during matching, and the two are embedded and matched, which may also reduce the volume of the ear hook assembly 12.

In some embodiments, as shown in FIG. 14, the splicing edge 1201 of the first ear hook housing 121 may be provided with a first stop part 1213, and the splicing edge 1202 of the second ear hook housing 123 is provided with a second stop part 1234. The first stop part 1213 and the second stop part 1234 may be engaged with each other to limit the relative movement of the first ear hook housing 121 and the second ear hook housing 123 in the longitudinal direction. For example, the first stop part 1213 may be an opening formed by the splicing edge 1201 of the first ear hook housing 121, and the second stop part 1234 may be a protrusion formed by the splicing edge 1202 of the second ear hook housing 123. The shapes of the opening and the protrusion may conform to fit each other, so that the splicing edge 1201 of the first ear hook housing 121 and the splicing edge 1202 of the second ear hook housing 123 may complement each other to limit the relative movement of the first ear hook housing 121 and the second ear hook housing 123 in the longitudinal direction.

In some embodiments, the opening direction of the first stuck slot 1211 may be face the accommodating space 120. If the first stuck slot 1211 is directly formed in the first sub-accommodating space 1210, in the process of forming the first sub-accommodating space 1210 and the first stuck slot 1211 by using a mold, a draft direction for forming the first sub-accommodating space 1210 and a draft direction for forming the first stuck slot 1211 may interfere with each other Since the draft direction of the first stuck slot 1211 is within the first sub-accommodating space 1210, it may conflict with the draft direction of other structures, which brings great difficulties in production. In order to solve the above-mentioned technical difficulties, the following structures may be designed in the embodiment of the present disclosure to reduce the difficulty of production and manufacture.

Figure 15:
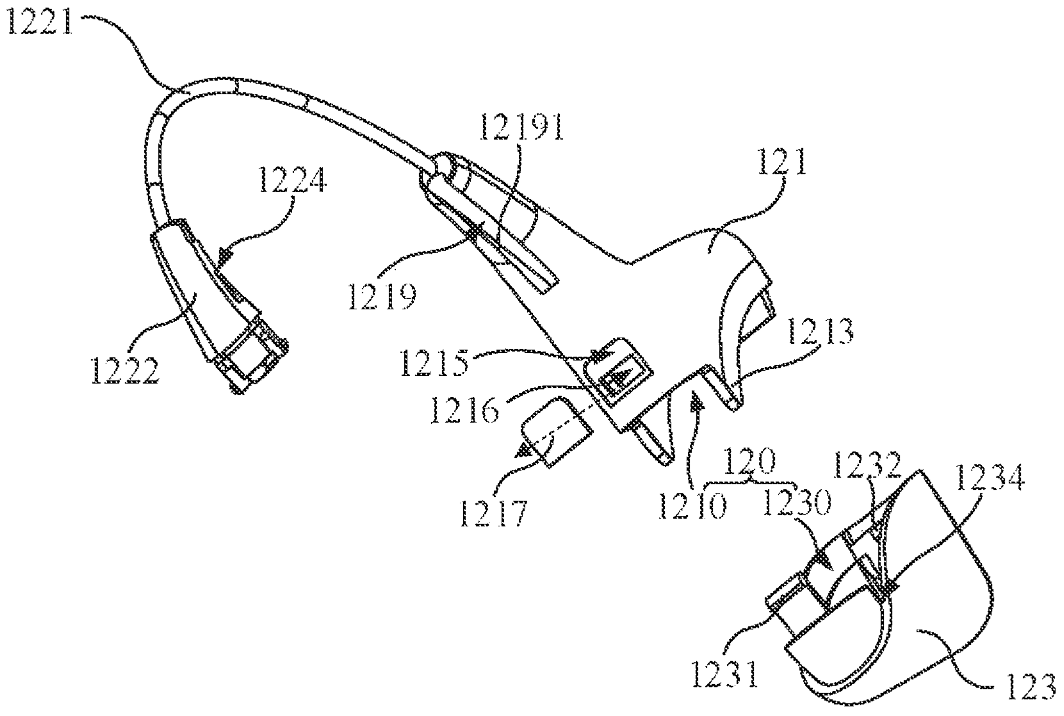
FIG. 15 illustrates another schematic structural diagram of a first ear hook housing and a second ear hook housing according to some embodiments of the present disclosure.

FIG. 15 illustrates another schematic structural diagram of a first ear hook housing and a second ear hook housing according to some embodiments of the present disclosure. As shown in FIG. 14 and FIG. 15, the first ear hook housing 121 may be provided with an outer hole segment 1215 and an inner hole segment 1216 communicating with each other in a direction from the outside of the accommodating space 120 to the inside of the accommodating space 120. The opening direction of the outer hole segment 1215 may face away from the accommodating space 120, the opening direction of the inner hole segment 1216 may face the accommodating space 120, and the outer hole segment 1215 and the inner hole segment 1216 communicate with each other. A filler 1217 may be filled in the outer hole segment 1215. In some embodiments, the filler 1217 may be a rubber piece, such as a hard glue. After the outer hole segment 1215 may be filled and blocked by the filler 1217, the inner hole segment 1216 may be used as the first stuck slot 1211 (shown in FIG. 14), and the opening direction of the inner hole segment 1216 faces the accommodating space 120 and can match with the first stuck block 1231.

In the actual manufacturing process, from the outside of the first ear hook housing 121 to the inside of the first ear hook housing 121, an outer hole segment 1215 and an inner hole segment 1216 may be formed in turn, and the draft direction may be not in the first sub-accommodating space 1210, but outside the first ear hook housing 121. It can be understood that the draft direction is the direction away from the first sub-accommodating space 1210 (the direction indicated by the arrow in the dotted line in FIG. 15). Then, the outer hole segment 1215 may be filled with the filler 1217, so that the remaining inner hole segment 1216 may be used as the first stuck slot 1211, which effectively reduces the difficulty and complexity of manufacturing, and saves costs.

In some embodiments, a cross-sectional area of the outer hole segment 1215 perpendicular to the communicational direction of the outer hole segment 1215 and the inner hole segment 1216 may be greater than a cross-sectional area of the inner hole segment 1216 perpendicular to the communicational direction. Since the corresponding cross-sectional area of the outer hole segment 1215 is larger than the corresponding cross-sectional area of the inner hole segment 1216, it is convenient to fill the outer hole segment 1215 with the filler 1217 and form the first stuck slot 1211 to improve the blocking effect.

In some embodiments, the outer hole segment 1215 and the inner hole segment 1216 of the ear hook assembly 12 described above may be manufactured by the manufacturing method of the ear hook assembly 12 described below.

In S100, the first ear hook housing 121 and the second ear hook housing 123 may be formed by injection molding, the outer hole segment 1215 and the inner hole segment 1216 that communicate with each other may be formed in the first ear hook housing 121 from the outside of the first ear hook housing 121 to the inside of the first ear hook housing 121, and the first stuck g block 1231 may be formed on the second ear hook housing 123.

In S200, the filler 1217 may be filled into the outer hole segment 1215, and the inner hole segment 1216 may be used as the first stuck slot 1211. In some embodiments, the filler 1217 may be filled in the outer hole segment 1215 by injection molding.

In order to protect the first ear hook housing 121, the first ear hook housing 121 may be wrapped with an ear hook elastic coating 1223 (shown in FIG. 12) after the operation S200, and the specific operations are as follows.

In S210, the first ear hook housing 121 may be wrapped with the ear hook elastic coating 1223 by injection molding, and the outer hole segment 1215 may be covered.

In S300, the first ear hook housing 121 and the second ear hook housing 123 may be spliced through the clamped-fitted of the first stuck slot 1211 and the first stuck block 1231.

In some embodiments, one or more structures in the ear hook assembly 12 (e.g., the first ear hook housing 121, the second ear hook housing 123, etc.) may be manufactured by 3D printing. In some embodiments, the ear hook assembly 12 may be manufactured by using an existing molding method on the basis of the specific structure of the ear hook assembly 12 described above, which will not be repeated here.

In order to better reduce the volume of the ear hook assembly 12, the positions of the components in the accommodating space 120 may be replaced or reset. If a electrical socket 1233 of the acoustic output apparatus 1 is disposed on the housing bottom 1236 of the second ear hook housing 123 away from the first ear hook housing 121, the volume of the ear hook assembly 12 may be increase. In order to effectively reduce the volume of the ear hook assembly 12, in this embodiment, the electrical socket 1233 may be disposed on a housing side 1237 of the second ear hook housing 123 away from the connecting part 122, and the detailed description may be provided below.

As shown in FIG. 12 and FIG. 14, a portion of housing (i.e., the side surface 1237) of the second ear hook housing 123 away from the connecting part 122 may be provided with an electrical socket 1233. The electrical socket 1233 may be communicated with the accommodating space 120, and the electrical socket 1233 may be used to accommodate the power interface 152 described in FIG. 11 (not shown in FIG. 12 and FIG. 14). In some embodiments, the second ear hook housing 123 may also have a housing bottom 1236 and a housing side 1237, and the housing side 1237 may surround and connect the housing bottom 1236 to form a second sub-accommodating space 1230. A side edge of the housing side 1237 away from the housing bottom 1236 may be used as the splicing edge 1202 for splicing with the first ear hook housing 121. The electrical socket 1233 may be opened on the housing side 1237, and communicated with the second sub-accommodating space 1230, that is, communicated with the accommodating space 120. It should be noted that the housing bottom 1236 refers to a portion of the second ear hook housing 123 away from the first ear hook housing 121, and the housing side 1237 refers to a portion of the second ear hook housing 123 away from the connecting part 122. In some embodiments, the housing side 1237 may also be a portion of the second ear hook housing 123 close to the connecting part 122.

As shown in FIG. 14, the second stuck block 1232 may be disposed adjacent to the electrical socket 1233, that is, the second stuck block 1232 may be protruded from a portion of the second ear hook housing 123 away from the connecting part 122, and face the accommodating space 120. In some embodiments, the second stuck block 1232 may be closer to the accommodating space 120 than the electrical socket 1233. In other words, the second stuck block 1232 may be closer to the connecting part 122 than the electrical socket 1233.

In some embodiments, projections of the second stuck block 1232 and the electrical socket 1233 on a first reference plane perpendicular to the longitudinal direction may overlap each other. The overlapping each other may include a partial overlap (i.e., the overlapping part is a portion of the projection of the second stuck block 1232 and also a portion of the projection of the electrical socket 1233), and also may include full overlap (i.e., the projection of the second stuck block 1232 falls completely into the projection of the electrical socket 1233).

In some embodiments, a plane perpendicular to the longitudinal direction may be used as the first reference plane, and the projection of the second stuck block 1232 on the first reference plane may be within the projection of the electrical socket 1233 on the first reference plane, that is, the projection ranges of the two all overlap. Setting the positions of the second stuck block 1232 and the electrical socket 1233 in this way may make the structure of the second ear hook housing 123 compact without affecting the installation of the power interface 152, thereby reducing the volume of the ear hook assembly 12.

In some embodiments, projections of the second stuck block 1232 and the electrical socket 1233 on a second reference plane perpendicular to the splicing direction may overlap each other. The overlap each other also include partial overlap, or all overlap. Optionally, a plane perpendicular to the splicing direction may be used as the second reference plane, and the projection of the second stuck block 1232 on the second reference plane may be also within the projection of the electrical socket 1233 on the second reference plane, that is, the projection ranges of the two also all overlap. In this way, the structure arrangement of the second stuck block 1232 and the electrical socket 1233 may be relatively compact in both the splicing direction and the longitudinal direction, which may greatly save the space occupied by the electrical socket 1233 and the second stuck block 1232 to improve the structural compactness of the ear hook assembly 12.

In addition, the acoustic output apparatus 1 is used in the manufacturing field such as industry, and there may be a great requirement for the operating experience of the acoustic output apparatus 1. The electrical socket 1233 is opened in a portion of the second ear hook housing 123 away from the connecting part 122 may improve the operating experience of the acoustic output apparatus 1 for the following reasons.

The acoustic output apparatus 1 generally has volume buttons, etc. According to the existing conventional approaches, button holes 1235 corresponding to the button 153, etc., and the electrical socket 1233 are generally provide with the housing bottom 1236 of the second ear hook housing 123, that is, the portion of the second ear hook housing 123 away from the first ear hook housing 121. Since an area of the housing bottom 1236 is relatively limited, a space between the button holes 1235 and the electrical socket 1233 is relatively compact, and the button holes 1235 and the electrical socket 1233 occupy as little space as possible. In industrial and other manufacturing fields, the wearer may wear work clothes or gloves, etc., the button holes 1235 are small and the arrangement is too compact, which may reduce the wearer's control experience and easily lead to wrong control. In some embodiments of the present disclosure, the electrical socket 1233 is not provided on the housing bottom 1236, but provided on the housing side 1237. The button holes 1235 may be designed to be larger, and gaps between adjacent button holes 1235 may be relatively great, which may facilitate the user to operate and reduce the occurrence of misoperation.

In addition, based on the above-mentioned design of the electrical socket 1233, if the second stuck block 1232 is arranged on the second ear hook housing 123 adjacent to the electrical socket 1233 and faces the top position of the first ear hook housing 121 (as shown in FIG. 13, a platform area connected to the second stuck block 1232, that is, the second stuck block 1232 may be regarded as extending from the platform area into the second sub-accommodating space 1230), a space of a socket 1218 of the first ear hook housing 121 may be squeezed, which may affect the plug-fitted between the ear hook assembly 12 and the rear hook assembly 13. The second stuck block 1232 needs to occupy additional space, so that the splicing of the first ear hook housing 121 and the second ear hook housing 123 in the splicing direction may occupy a large space, which may be not compact enough. Therefore, in some embodiments, the electrical socket 1233 may be disposed on the housing side 1237 of the second ear hook housing 123, and a structural relationship between the second stuck block 1232 and the electrical socket 1233 may be set by using the above-mentioned projection relationship, so that the structure of the second ear hook housing 123 may be more compact in the splicing direction. The second stuck block 1232 extends toward the accommodating space 120, so that no additional space is occupied, and the volume of the ear hook housing 12 may be miniaturized.

The stable splicing structure between the first ear hook housing 121 and the second ear hook housing 123 may protect the battery assembly 14 and the control circuit assembly 15 in the accommodating space 120. Of course, in order to reduce the failure rate of the acoustic output apparatus 1, it is not only necessary to ensure the stability of the structure, but also to improve the stability of the electrical connection. The stability of wiring a set of lead wires between the speaker assembly 11 and the ear hook assembly 12 in the acoustic output apparatus 1 may be related to the reliability of the relevant components (e.g., the speaker assembly 11) of the acoustic output apparatus 1. In order to improve the reliability of the wiring, the ear hook assembly 12 may be provided with a corresponding wire clamping structure, so as to improve the stability of the set of lead wires when the set of lead wires passes through the ear hook assembly 12. For more details, refers to the following description.

In some embodiments, the connection part 122 may include at least one lead wire channel, and the at least one lead wire channel may be used to limit the set of lead wires that may be led out from the speaker assembly 11 and protrude into the accommodating space 120. The set of lead wires may be used to realize the electrical connection between the microphone tube assembly 16, the speaker assembly 11, the battery assembly 14, and/or the control circuit assembly 15, so as to supply power to the microphone tube assembly 16 and/or the speaker assembly 11, or control the microphone tube assembly 16 and/or speaker assembly 11. In some embodiments, in order to allow the set of lead wires drawn out from the speaker assembly 11 and extending into the accommodating space 120 to pass through the at least one lead wire channel, the at least one lead wire channel may restrict the set of lead wires, so as to reduce the shaking of the set of lead wires, and a difference between a diameter of the at least one lead wire channel and a diameter of the set of lead wires is within a specific range. For example, the specific range may be 5%, 10%, 15%, 20%, etc., of the diameter of the set of lead wires. In some embodiments, the at least one lead wire channel may be circumferentially fully enclosed channels, and the set of lead wires may all be located within the lead wire channels. In some embodiments, the at least one lead wire channel may also be circumferentially semi-closed channels, and the set of lead wires may be located at least partially within the lead wire channels. For example, the at least one lead wire channel may include a plurality of sections of lead wire channels spaced apart, and the set of lead wires pass through the plurality of sections of lead wire channels in sequence. In some embodiments, the at least one lead wire channel may have notches (e.g., arc-shaped notches, etc.) capable of clamping the set of lead wires, and the set of lead wires may be restricted by the notches when passing through the at least one lead wire channel, so as to limit the shaking of the set of lead wires in its radial direction, and reduce the adverse effect of the shaking of the set of lead wires on the speaker assembly 11 and/or the microphone tube assembly 16.

In some embodiments, as shown in FIG. 12, the connecting part 122 may include an ear hook elastic wire 1221 and a joint part 1222 connected to one end of the ear hook elastic wire 1221. The joint part 1222 may be used to plug-fitted with the speaker assembly 11, and the other end of the ear hook elastic wire 1221 may be connected with the first ear hook housing 121. In order to protect the ear hook elastic wire 1221, the connecting part 122 may also include an ear hook elastic coating 1223 wrapping a periphery of the ear hook elastic wire 1221. In some embodiments, the ear hook elastic coating 1223 may further wrap the first ear hook housing 121.

Figure 16:
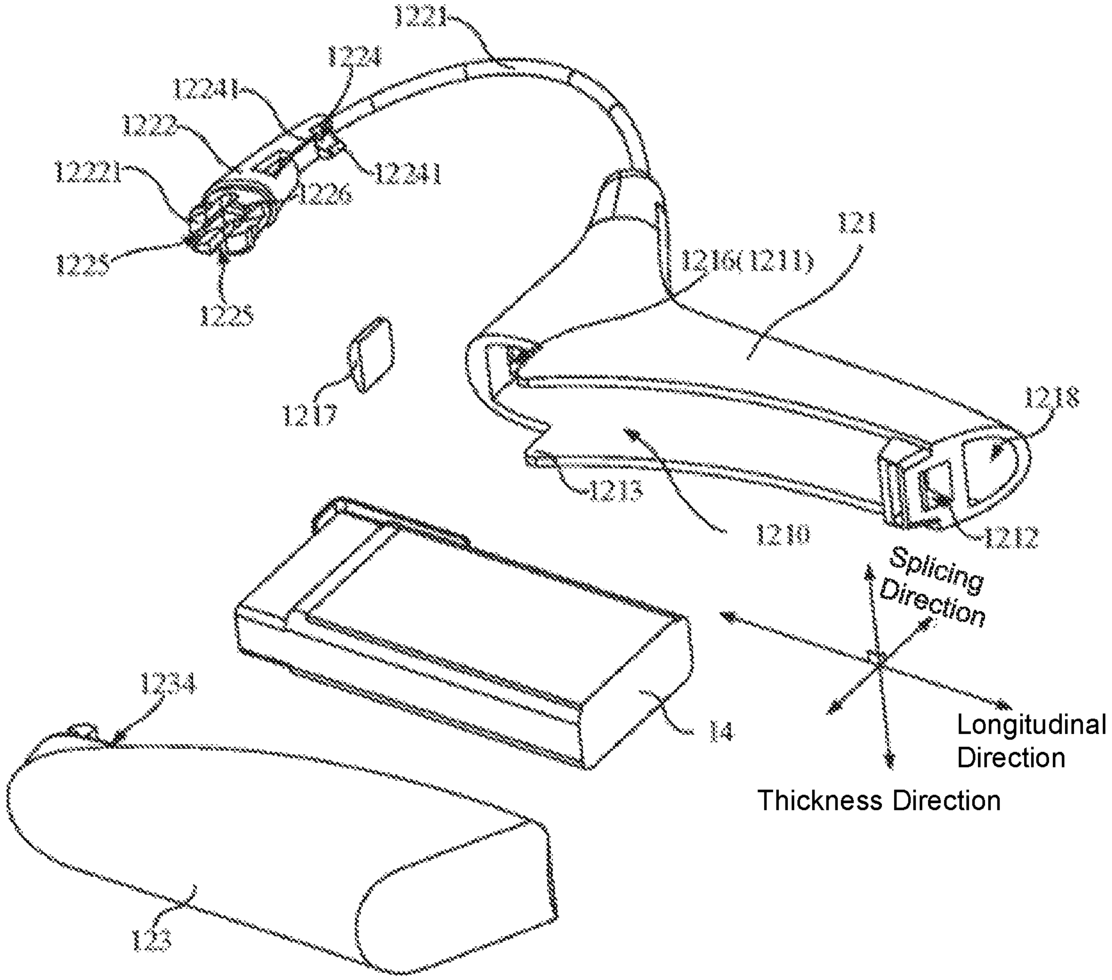
FIG. 16 illustrates another exploded schematic diagram of an ear hook assembly according to some embodiments of the present disclosure.

FIG. 15 illustrates another schematic structural diagram of the first ear hook housing and the second ear hook housing according to some embodiments of the present disclosure. FIG. 16 illustrates another exploded schematic diagram of an ear hook assembly according to some embodiments of the present disclosure. As shown in FIG. 15 and FIG. 16, in some embodiments, the joint part 1222 may include a first wire clamping part 1224. The first wire clamping part 1224 may include a first lead wire channel. In some embodiments, the first lead wire channel may be a notch extending along a longitudinal direction of the first wire clamping part 1224, and the shape of the notch may be matched the shape of the set of lead wires. For example, the shape of the set of lead wires is cylindrical, and a cross-sectional shape of the notch may be a circle, a semi-circle, or an ellipse that matches the shape of the set of lead wires. In some embodiments, the cross-sectional shape of the notch may not match the shape of the set of lead wires. For example, the shape of the set of lead wires is cylindrical, the cross-sectional shape of the notch may be quadrilateral, and the notch may be used to place the set of lead wires. In some embodiments, the first wire channel may be a closed channel extending along the longitudinal direction of the first wire clamping part 1224, and the set of lead wires may extend through the closed channel into the accommodating space 120 of the ear hook housing.

In some embodiments, in order to better introduce the set of lead wires into the accommodating space 120 of the ear hook housing and prevent the set of lead wires from shaking in the accommodating space 120 of the ear hook housing, the first ear hook housing 121 may include a second wire clamping part 1219. The second wire clamping part 1219 may include a second lead wire channel. In some embodiments, the second lead wire channel may be a notch extending along a longitudinal direction of the second wire clamping part 1219. Similar to the first lead wire channel, a shape of the second lead wire channel may be or may not be matched with the shape of the set of lead wires. In some embodiments, the second wire channel may be a closed channel extending along the longitudinal direction of the second wire clamping part 1219, and the set of lead wires may pass through the closed channel and extend into the accommodating space 120 of the ear hook housing. In some embodiments, the first lead wire channel and the second lead wire channel may be communicated with the second through hole 111 of the speaker assembly 11 shown in FIG. 6. The set of lead wires drawn out from the speaker assembly 11 may enter the accommodating space 120 through the first lead wire channel and the second lead wire channel in sequence. The first wire clamping part 1224 and the second wire clamping part 1219 are used to clamp the set of lead wires in the radial direction of the set of lead wires, so as to reduce the shaking of the set of lead wires in the radial direction. In some embodiments, only one of the first wire clamping part 1224 and the second wire clamping part 1219 may be used to clamp the set of lead wires in the radial direction of the set of lead wires. That is, the connecting part 122 may only include one wire clamping part, and the wire clamping part may be the first wire clamping part 1224 on the joint part 1222, or the second wire clamping part 1219 on the first ear hook housing 121.

In some embodiments, the set of lead wires clamped by the first wire clamping part 1224 and the second wire clamping part 1219 may be additional components such as auxiliary titanium wires used in the preparation process of the ear hook assembly 12. Specifically, during the preparation process of the ear hook assembly 12, auxiliary titanium wires need to be used to form lead wire channels in the ear hook elastic coating 1223. Therefore, during the preparation process, the auxiliary titanium wires may be passed through the first wire channel of the first wire clamping part 1224 and the second wire channel of the second wire clamping part 1219 into the accommodating space 120 in sequence. After the preparation is completed, the auxiliary titanium wires may be pulled out to form a lead wire channel connecting the containment space 110 and the accommodating space 120. The first wire channel of the first wire clamping part 1224 and the second wire channel of the second wire clamping part 1219 may maintain the stability of the auxiliary titanium wires during the preparation process and reduce the shaking of the auxiliary titanium wires, so as to make the glue position more stable.

In some embodiments, the lead wire channel (the first lead wire channel and/or the second lead wire channel) may be disposed within the ear hook elastic coating 1223 in parallel with the ear hook elastic wire 1221. In some embodiments, the ear hook elastic wire 1221 may be disposed in the lead wire channel.

In some embodiments, the set of lead wires that is clamped by the first wire clamping part 1224 and the second wire clamping part 1219 may be a set of lead wires that passes through the lead wire channel after the lead wire channel is formed for electrical connection. The set of lead wires drawn out through the speaker assembly 11 may enter the accommodating space 120 through the first wire channel of the first wire clipping part 1224 and the second wire channel of the second wire clipping part 1219 to electrical communicate with the battery assembly 14 and/or the control circuit assembly 15 (not shown in FIG. 15). Since the ear hook assembly 12 may be used to hang on the human ear, it is generally arranged in an arc shape, and the set of lead wires passing through the ear hook assembly 12 may be prone to shake or move, etc. The wobble of the set of lead wires may be reduced by the first wire clipping part 1224 and the second wire clipping part 1219.

In some embodiments, the ear hook elastic coating 1223 may also be formed with the lead wire channel (not shown in the figures). The set of wires drawn out through the speaker assembly 11 may enter the inside of the accommodating space 120 through the first lead wire channel of the first wire clamping part 1224, the lead wire channel of the ear hook elastic coating 1223 and the second lead wire channel of the second wire clamping part 1219 in sequence. In some embodiments, when the speaker assembly 11 is connected with the microphone tube assembly 16, the set of lead wires drawn out from the speaker assembly 11 may include a set of lead wires of the speaker 113 and a set of lead wires of the microphone tube assembly 16. In some embodiments, when the speaker assembly 11 is not connected with the microphone tube assembly 16, the set of lead wires drawn out from the speaker assembly 11 may only include the set of lead wires of the speaker 113.

By arranging the first wire clamping part 1224 and the second wire clamping part 1219 on the joint part 1222 and the first ear hook housing 121, respectively, on the one hand, the movement of the auxiliary titanium wires relative to the first ear hook housing 121 and the joint part 1222 may be restricted during the preparation process and make the glue position of the ear hook assembly 12 more uniform and improve the yield rate; on the other hand, the movement of the set of lead wires in its radial direction may be restricted, which may reduce the shaking of the set of lead wires, improve the threading efficiency of the set of lead wires and the stability of the structure of the set of lead wires in the actual product, thereby ensuring the stability of the electrical connection.

In some embodiments, as shown in FIG. 16, the first wire clamping part 1224 may have two first sub-wire clamping parts 12241 arranged at intervals in the thickness direction of the joint part 1222. The two first sub-wire clamping parts 12241 arranged at intervals in the thickness direction of the joint part 1222 may be disposed opposite to each other, so that a first wire channel for limiting the set of lead wires is formed between the two first sub-wire clamping parts 12241. In some embodiments, the opposite side walls of the two first sub-wire clamping parts 12241 may be flat, concave, or convex. For example, when the shape of the set of lead wires is cylindrical, the opposite side walls between the two first sub-wire clamping parts 12241 are concave, and the first wire channel formed by the two first sub-wire clamping parts 12241 may be a channel with an approximately circular cross-section. In some embodiments, the thickness direction of the joint part 1222 may be parallel to the thickness direction of the accommodating space 120, and the thickness direction of the accommodating space 120 may be shown in the three-dimensional coordinate system in FIG. 16. In some embodiments, the two first sub-wire clamping parts 12241 may be staggered from each other in a longitudinal direction of the set of lead wires, and the two first sub-wire clamping parts 12241 may clamp the set of lead wires in the thickness direction of the joint part 1222 when the set of lead wires passes through the first wire channel formed by the two first sub-wire clamping parts 12241, so that the movement of the set of lead wires in the thickness direction of the joint part 1222 may be restricted. In some embodiments, the two first sub-wire clamping parts 12241 may also at least partially overlap in the longitudinal direction of the set of lead wires. In some embodiments, the extension lengths of the two first sub-wire clamping parts 12241 in the longitudinal direction of the set of lead wires may be the same or different, and may be adaptively adjusted according to the lengths of the set of lead wires or the joint part 1222. In some embodiments, the first wire clamping part 1224 may have at least two first sub-wire clamping parts 12241 arranged at intervals in the thickness direction of the joint part 1222, and the at least two first sub-wire clamping parts 12241 are staggered from each other or at least partially overlapped in the longitudinal direction of the set of lead wires, so that the first wire clamping part 1224 is more stable in the clamping of the set of lead wires. It should be noted that a count of the first sub-wire clamping parts 12241 is not limited to the above two, but may also be three, four, or more. Each of the first sub-wire clamping parts 12241 may be set according to the above-mentioned distribution of the two first sub-wire clamping parts 12241.

In some embodiments, the second wire clamping part 1219 may include two second sub-wire clamping parts 12191 arranged at intervals in the thickness direction of the joint part 1222, and the two second sub-wire clamping parts 12191 may be disposed opposite to each other. The two second sub-wire clamping parts 12191 may clamp the set of lead wires in the thickness direction of the joint part 1222 when the set of lead wires passes between the two second sub-wire clamping parts 12191, so that the movement of the set of lead wires in the thickness direction of the joint part 1222 may be restricted. In some embodiments, the second wire clamping part 1219 may have at least two second sub-wire clamping parts 12191 arranged at intervals in the thickness direction of the joint part 1222, and the at least two second sub-wire clamping parts 12191 are arranged at intervals. A shape or structure of a second sub-wire part 12191 may be similar to the shape or structure of a first sub-wire clamping part 12241. For more details, refers to the description of the first sub-wire clamping part 12241, which will not be repeated here.

In some embodiments, the first wire clamping part 1224 may be formed by concaving the joint part 1222, and the second wire clamping part 1219 may be formed by concaving the first ear hook housing 121. For example, the first wire clamping part 1224 and the second wire clamping part 1219 may be both grooves, and the grooves may not only clamp the set of lead wires, but also make the set of lead wires visible at the first clamping part 1224 and the second clamping part 1219, which may reduce a distance of the set of lead wires passing through an invisible area, thereby facilitating the threading of the set of lead wires and improving the efficiency of the threading.

In order to facilitate the joint part 1222 to be plugged into the second through hole 1111 (shown in FIG. 6) of the first speaker housing 111, and to enhance the connection stability between the joint part 1222 and the second through hole 1111, the joint part 1222 may include at least two sub-ends. The at least two sub-ends may be located at one end of the joint part 1222 (e.g., the second through hole 1111) that is inserted with the speaker assembly 11. In some embodiments, the at least two sub-ends may be spaced apart along a circumferential direction of the end that is inserted with the speaker assembly 11. Specifically, when the joint part 1222 is inserted into the second through hole 1111, the at least two sub-ends may be squeezed and moved closer to each other, so that the end of the joint part 1222 to be inserted into the speaker assembly 11 may become smaller, so that it may be inserted smoothly inside the second through hole 1111. In some embodiments, a count of sub-ends of the joint part 1222 may be three, four, five, or more.

In order to more clearly describe the sub-ends of the joint part 1222, the joint part 1222 including four sub-ends is provided in FIG. 16. As shown in FIG. 16, in some embodiments, an end 12221 of the joint part 1222 may include two through grooves 1225 crossing each other to divide the end 12221 into four sub-ends. The end 12221 may be divided into four sub-ends by providing two through grooves 1225 crossing each other, which may enhance the elasticity of the end 12221, so that the four sub-ends may be squeezed and elastically restored. When the joint part 1222 is inserted into the second through hole 1111, the four sub-ends may be squeezed to be close to each other, so that the end 12221 becomes smaller and the joint part 1222 may be inserted into the second through hole 1111. In some embodiments, the sub-ends and an end surface of the joint part 1222 may have an angle, and the angle may refer to an angle between the extending direction of the sub-ends and the radial direction of the end surface. Since the sub-ends have a certain elasticity, the sub-ends may be deformed when subjected to an external force (e.g., squeezed during the plugged), and the angle between the sub-ends and the end surface of the joint part 1222 may be changed, causing the sub-ends to become larger, and be closed to each other. After the sub-ends extend into the second through hole 1111, the external force may be removed, the angle between the sub-ends and the end surface of the joint part 1222 may become smaller, and the sub-ends may be spread out from each other, so as to ensure that the joint part 1222 can be smoothly plugged and fixed with the second through hole 1111 In some embodiments, when the sub-ends are not subjected to an external force, the angle between the sub-ends and the end surface of the joint part 1222 may be in the range of 60°-100°. Preferably, the angle between the sub-ends and the end surface of the joint part 1222 may be in the range of 70°-95°. Further preferably, the angle between the sub-ends and the end surface of the joint part 1222 may be in the range of 80°-90°. It should be noted that the angles between each sub-end and the end surface of the joint part 1222 may be the same or different.

In some embodiments, the peripheries of the sub-ends may be protruded with protrusions 1226. When the joint part 1222 is inserted into the speaker assembly 11, the protrusions 1226 may be locked and limited by the speaker assembly 11 so as to restrict the joint part 1222 from moving in a direction away from the speaker assembly 11. Specifically, after the joint part 1222 is inserted into the second through hole 1111, the sub-ends located in the second through hole 1111 may restore elastic deformation, so that the protrusions 1226 on the peripheries of the sub-ends may be locked and limited by the speaker assembly 11, so that the connection reliability of the ear hook assembly 12 and the speaker assembly 11 may be improved. In some embodiments, the protrusions 1226 may be provided on the periphery of only one sub-end. In some embodiments, the protrusions 1226 may be provided on the peripheries of many or all of the sub-ends.

Specifically, when the sub-ends of the joint part 1222 are inserted into the second through hole 1111, the protrusions 1226 may be located in the containment space 110, and the protrusions 1226 may be clamped on an edge of the connection between the second through hole 1111 and the containment space 110. The abutment between the edge and the protrusions 1226 may limit the movement of the joint part in the axial direction in the second through hole 1111, thereby increasing the connection reliability of the ear hook assembly 12 and the speaker assembly 11.

In some embodiments, the material of the ear loop elastic wire 1221 may be a spring steel, a titanium, other metal material, or non-metal material. The ear hook elastic wire 1221 may provide rigidity to the connecting part 122 so that it is not easily deformed. In some embodiments, the material of the ear hook elastic coating 1223 may be a silicone, a rubber, a plastic, etc., or other materials. The ear hook elastic coating 1223 may have a certain flexibility, which may increase the user's comfort when wearing the acoustic output apparatus 1. In some embodiments, the ear hook elastic coating 1223 may wrap the ear hook elastic wire 1221, and may further wraps the first ear hook housing 121, the second ear hook housing 123, and the second wire clamping part 1219 on the first ear hook housing 121. In some embodiments, the electrical socket 1233, etc., may be exposed outside the ear hook elastic coating 1223 to facilitate the charging of the acoustic output apparatus 1. In some embodiments, the ear hook elastic coating 1223 may also wrap at least part of the joint part 1222 and the first wire clamping part 1224.

In some embodiments, the acoustic output apparatus 1 may include two ear hook assemblies 12, in order to realize the connection and communication between the two ear hook assemblies 12, and to make the acoustic output apparatus 1 more convenient to wear, the acoustic output apparatus 1 may also include a rear hook assembly 13. The rear hook assembly 13 may be described in detail below.

Figure 17:
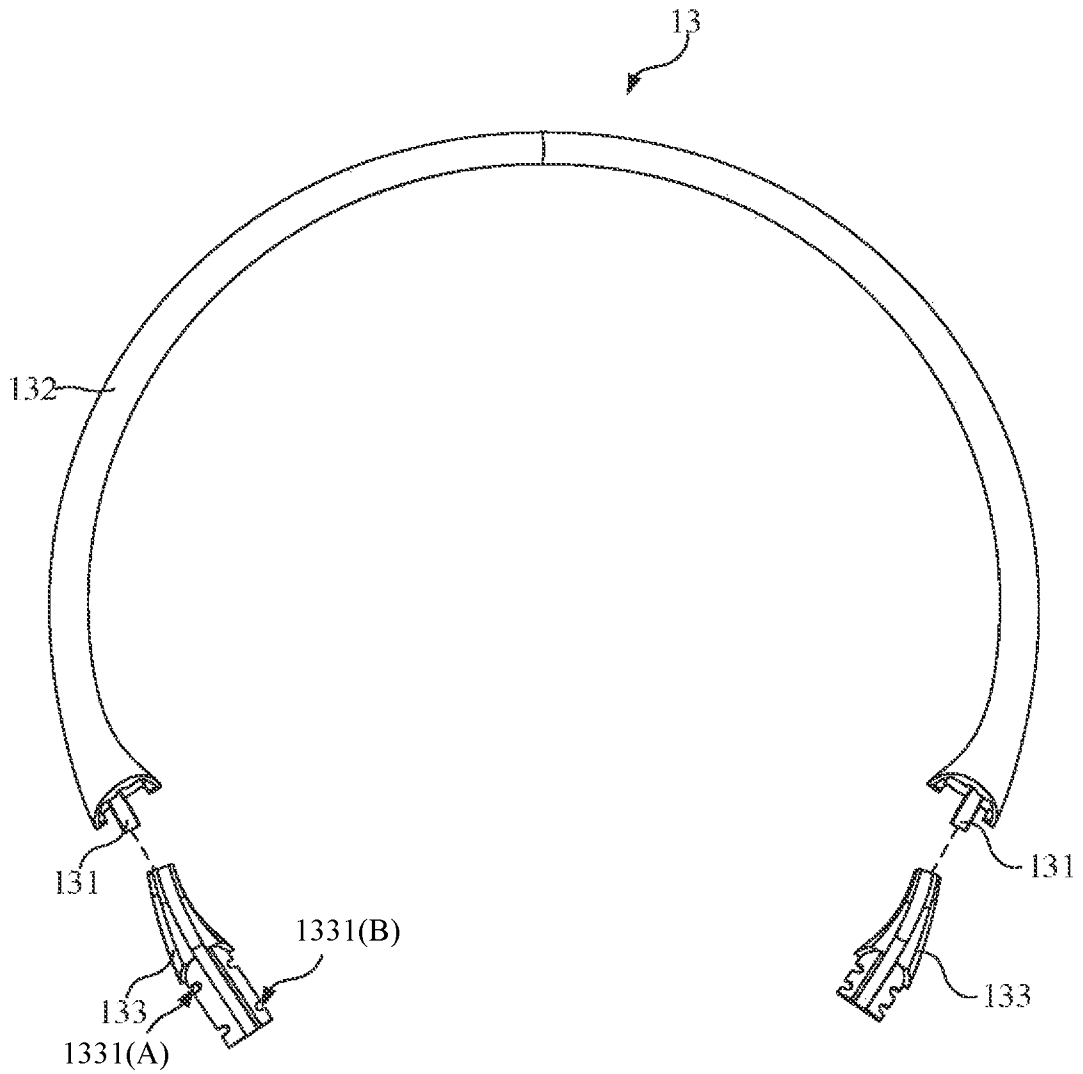
FIG. 17 illustrates a schematic exploded diagram of a rear hook assembly according to some embodiments of the present disclosure.

FIG. 17 illustrates a schematic exploded diagram of a rear hook assembly according to some embodiments of the present disclosure. As shown in FIG. 17, the rear hook assembly 13 may include a rear hook elastic wire 131, a rear hook elastic coating 132, and an insertion part 133. The rear hook elastic coating 132 may wrap the rear hook elastic wire 131, and the insertion part 133 may be disposed at both ends of the rear hook elastic wire 131. The rear hook elastic coating 132 may also wrap at least part of the insertion part 133. At least one insertion part 133 may be spaced apart from two sets of slots 1331 in the extending direction of the slots 1331, and each set of slots 1331 may include at least one slot 1331. The rear hook elastic wire 131 may be inserted into the insertion part 133 through one end of the insertion part 133. As shown in FIG. 17, the first set of slots 1331A may be adjacent to the insertion part 133, and the second set of slots 1331B may be away from one end of the insertion part 133.

Figure 18:
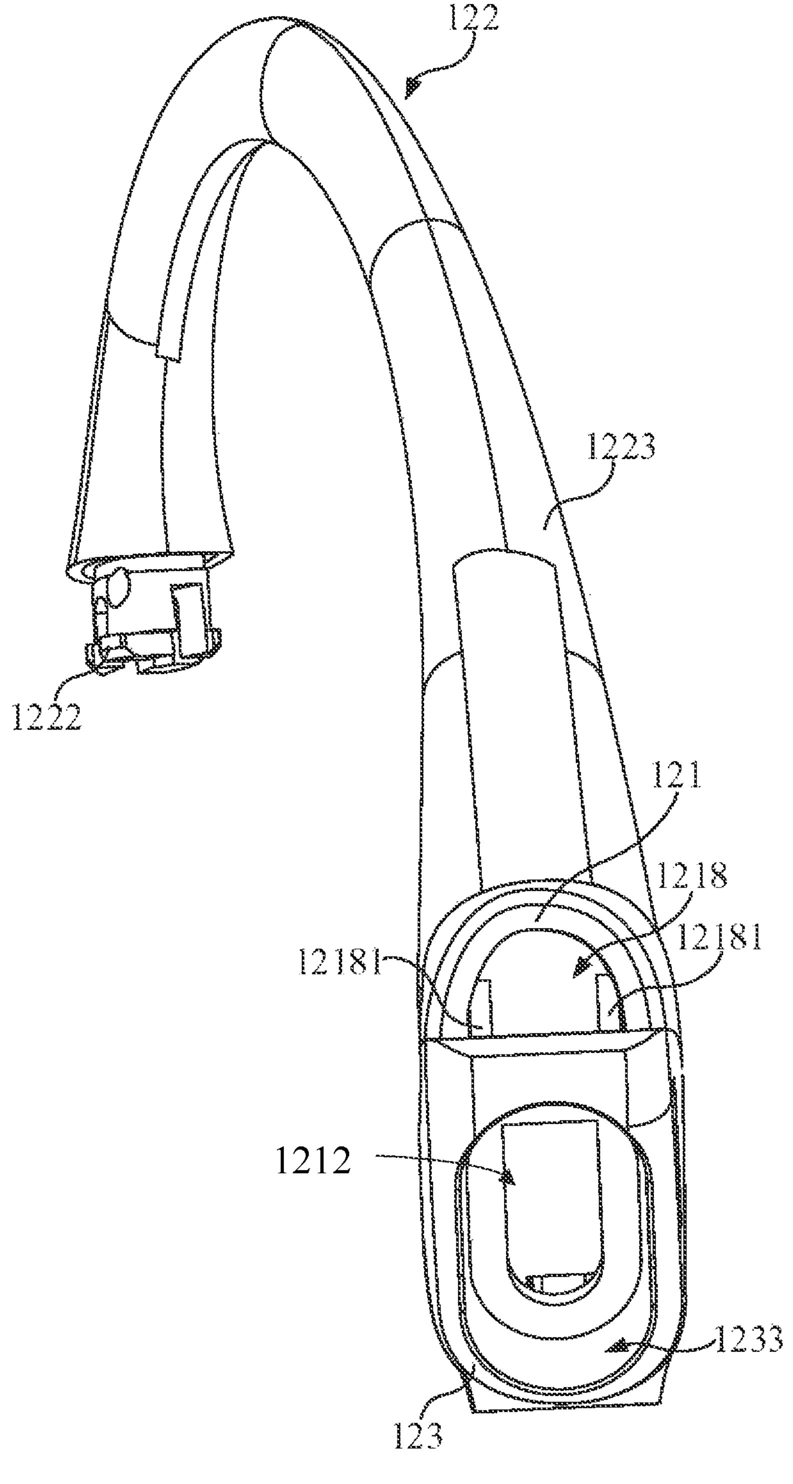
FIG. 18 illustrates a schematic structural diagram of an ear hook assembly according to some embodiments of the present disclosure.

FIG. 18 illustrates a schematic structural diagram of an ear hook assembly according to some embodiments of the present disclosure. The rear hook assembly 13 shown in FIG. 17 may be plug-fitted with the ear hook assembly shown in FIG. 18. As shown in FIG. 18, a side of the first ear hook housing 121 away from the connecting part 122 may be provided with a socket 1218 that communicates with the accommodating space 120. The socket 1218 and the second stuck slot 1212 may be arranged adjacent to each other. The insertion part 133 may be plug-fitted with the socket 1218.

In some embodiments, the insertion part 133 may be provided with the above-mentioned two sets of slots 1331 in sequence from one end of the insertion part 133 to the other end of the insertion part 133. The first set of slots 1331A near one end of the insertion part 133 may be used to mold positioning, and the second set of slots 1331B away from the end of the insertion part 133 may be used to clamped-fitted with the first ear hook housing 121. As shown in FIG. 17 and FIG. 18, the first ear hook housing 121 may be provided with a snap part 12181. The snap part 12181 may be disposed in the socket 1218 of the first ear hook housing 121 and corresponds to the slots 1331. When the insertion part 133 is inserted into the socket 1218, the snap part 12181 may be embedded in the second set of slots 1331B, thereby restricting the relative movement of the ear hook assembly 12 and the rear hook assembly 13.

The first set of slots 1331A may be close to one end of the insertion part 133, and used to mold positioning, that is, the first set of slots 1331A may be used to match with the corresponding protruding structures on the mold, and then the insertion part 133 may be precisely fixed at a certain position, which may facilitate other processes on the insertion part 133 and improve the yield rate. For example, the insertion part 133 and the rear hook elastic wire 131 may be positioned by using the first set of slots 1331A, and then the rear hook elastic coating 132 may be formed by injection molding or 3D printing.

In some embodiments, the slots 1331 extend from edges of the insertion part 133 on both sides of a central axis of the insertion part 133 toward the central axis. Each set of slots 1331 may include two slots 1331, and the two slots 1331 in each set may be arranged opposite to each other, that is, the opening directions of the two slots 1331 in each set are opposite.

It should be understood that the schematic diagrams provided in FIG. 3-FIG. 17 are for illustrative purposes only and are not intended to limit the scope of the present disclosure. Various variations and modifications may be made to those skilled in the art under the guidance of the present disclosure. These variations and modifications will fall within the scope of protection of this application. In some embodiments, one or more features such as the shape, the size, and the position of the elements shown in the figures may be adjusted according to actual conditions. In some embodiments, one or more elements shown in the figures may be omitted, or one or more other elements may be added. In some embodiments, one element may be replaced by other elements that perform similar functions. In some embodiments, an element may be split into multiple sub-elements, or multiple elements may be combined into a single element.

It should be noted that the beneficial effects that may be produced in different embodiments are different, and in different embodiments, the beneficial effects that may be produced may be any one or a combination of the above, or may also be any other possible beneficial effect.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus, comprising:

a speaker assembly, configured to convert an audio signal into a sound signal;

an ear hook assembly, including an ear hook housing and a connecting part, the ear hook housing having an accommodating space to accommodate a battery assembly and/or a control circuit assembly, one end of the connecting part connecting to the speaker assembly, and the other end of the connecting part connecting to the ear hook housing, wherein the connecting part includes a first wire clamping part used to restrict a set of lead wires drawn out from the speaker assembly and extending into the accommodating space, the set of lead wires electrically connect the speaker assembly to the battery assembly and/or the control circuit, the first wire clamping part fixes the set of lead wires in a radial direction of the set of lead wires, the first wire clamping part has a first lead wire channel, and the set of lead wires drawn out from the speaker assembly enters the accommodating space through the first lead wire channel; and the ear hook housing includes a second wire clamping part used to fix the set of lead wires in the radial direction of the set of lead wires, the second wire clamping part has a second lead wire channel, and the set of lead wires drawn out from the speaker assembly enters the accommodating space through the first lead wire channel and the second lead wire channel in sequence.

2. The acoustic output apparatus of claim 1, wherein the connecting part includes an ear hook elastic wire and a joint part connected to one end of the ear hook elastic wire, wherein the joint part is plug-fitted with the speaker assembly, and the other end of the ear hook elastic wire is connected to the ear hook housing.

3. The acoustic output apparatus of claim 1, wherein the first wire clamping part includes at least two first sub-wire clamping parts arranged at intervals, and the at least two first sub-wire clamping parts form the first lead wire channel in a length direction of the set of lead wires.

4. The acoustic output apparatus of claim 3, wherein extension lengths of the two first sub-wire clamping parts in the length direction of the set of lead wires are different.

5. The acoustic output apparatus of claim 1, wherein the second sub-clamping part includes two second sub-wire clamping parts arranged at intervals, and the two second sub-wire clamping parts are opposite to each other and form the second lead wire channel.

6. The acoustic output apparatus of claim 1, wherein the connecting part includes an ear hook elastic coating, and the ear hook elastic coating wraps a periphery of the ear hook elastic wire, a portion of the joint part, and a portion of the ear hook housing.

7. The acoustic output apparatus of claim 2, wherein the joint part includes at least two sub-ends, and the at least two sub-ends are located at one end of the joint part that is inserted with the speaker assembly, wherein the at least two sub-ends are spaced apart along a circumferential direction of the end that is inserted with the speaker assembly.

8. The acoustic output apparatus of claim 7, wherein peripheries of the at least two sub-ends are provided with protrusions, when the joint part is inserted into the speaker assembly, the protrusions are locked and limited by the speaker assembly, so as to restrict the joint part from moving in a direction away from the speaker assembly.

9. The acoustic output apparatus of claim 7, wherein the speaker assembly includes a first speaker housing, a second speaker housing, a speaker, and a rotating member, the first speaker housing and the second speaker housing are connected to form a containment space for accommodating the speaker, the first speaker housing is provided with a first through hole, the first through hole communicates with the containment space, and the rotating member is rotatably inserted into the first through hole.

10. The acoustic output apparatus of claim 9, wherein the first speaker housing is provided with a second through hole, the second through hole is spaced apart from the first through hole, the joint part is inserted into the second through hole, protrusions of the joint part are located in the containment space, and the protrusions are clamped on an edge of a connection between the second through hole and the containment space.

11. The acoustic output apparatus of claim 10, wherein the first speaker housing includes a bottom wall and a side wall connected to each other, the side wall surrounds the bottom wall, the second speaker housing covers on a side of the side wall away from the bottom wall to form the containment space, the first through hole is formed on the bottom wall, and the second through hole is formed on the side wall.

12. The acoustic output apparatus of claim 11, wherein the bottom wall includes a first convex part departing from the containment space, and the first through hole is formed in the first convex part;

the side wall includes a second convex part departing from the containment space, and the second through hole is formed in the second convex part;

wherein, a protruding direction of the first convex part and a protruding direction of the second convex part are perpendicular to each other, and the first convex part and the second convex part are connected in an arc shape.

13. The acoustic output apparatus of claim 10, wherein the apparatus further includes a microphone tube assembly connected to the rotating member, the microphone tube assembly is rotated relative to the first speaker housing by the rotating member, a set of lead wires of the microphone tube assembly passes through the first through hole, and enters into the second through hole through the containment space.

14. The acoustic output apparatus of claim 13, wherein the rotating member includes a lead part and a rotating part connected to each other, the lead part is formed with a first hole segment, the rotating part is formed with a second hole segment along an axial direction of the rotating part, and the first hole segment is communicated with the second hole segment;

the speaker assembly includes a fixing member, the fixing member includes a fixing body and a plug pin arranged at one end of the fixing body, the fixing body is inserted into the second hole segment, and the plug pin is inserted into a fixing hole to limit a movement of the microphone tube assembly.

15. The acoustic output apparatus of claim 14, wherein the rotating member includes a rotating body, a first clamping part, and a second clamping part, the first clamping part and the second clamping part are protruded on both ends of the rotating body along a radial direction of the rotating member, the rotating body is embedded in the first through hole, and the first clamping part and the second clamping part are respectively abutted on both sides of the first speaker housing to limit a movement of the rotating part in the axial direction of the rotating part.

16. The acoustic output apparatus of claim 13, wherein the speaker assembly includes a pressing member, configured to press the set of lead wires of the microphone tube assembly that passes through the first through hole to the second through hole, and the pressing member is disposed in the containment space and covers the first through hole.

17. The acoustic output apparatus of claim 16, wherein the pressing member includes a hard cover plate and an elastic body arranged in layers, and the hard cover plate is farther from the first through hole than the elastic body, wherein the elastic body contacts the set of lead wires.

18. The acoustic output apparatus of claim 13, wherein the microphone tube assembly includes an elastic connecting rod and a sound pickup assembly, and one end of the elastic connecting rod is inserted into the first through hole, the other end of the elastic connecting rod is plug-fitted with the sound pickup assembly, and the elastic connecting rod makes an average amplitude attenuation rate not smaller than 35% when a vibration of a voice frequency band generated by the speaker assembly is transmitted from one end of the elastic connecting rod to the other end of the elastic connecting rod.

19. The acoustic output apparatus of claim 18, wherein the apparatus includes an optical sensor, and the acoustic output apparatus is used to detect whether the acoustic output apparatus is worn through the optical sensor;

the ear hook housing forms a window for transmitting an optical signal of the optical sensor, the window is disposed adjacent to the connecting part so that the window is positioned adjacent to a base of a wearer's ear when the acoustic output apparatus is worn.

* * * * *